United States Patent
Yamamoto

(10) Patent No.: US 11,658,757 B2
(45) Date of Patent: May 23, 2023

(54) COMMUNICATION SYSTEM, MASTER DEVICE AND SUBMASTER DEVICE

(71) Applicant: Mitsubishi Electric Corporation, Tokyo (JP)

(72) Inventor: Hiroyuki Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 17/431,209

(22) PCT Filed: Sep. 18, 2019

(86) PCT No.: PCT/JP2019/036616
§ 371 (c)(1),
(2) Date: Aug. 16, 2021

(87) PCT Pub. No.: WO2020/213190
PCT Pub. Date: Oct. 22, 2020

(65) Prior Publication Data
US 2022/0116131 A1 Apr. 14, 2022

(30) Foreign Application Priority Data
Apr. 19, 2019 (JP) .............................. JP2019-080381

(51) Int. Cl.
- *H04L 41/5054* (2022.01)
- *H04J 3/06* (2006.01)
- *H04L 12/40* (2006.01)

(52) U.S. Cl.
CPC .......... *H04J 3/0638* (2013.01); *H04J 3/0602* (2013.01); *H04L 12/40019* (2013.01)

(58) Field of Classification Search
CPC ............. H04L 12/40019; H04L 12/403; H04L 12/2818; H04J 3/0667; H04J 3/0602
See application file for complete search history.

(56) References Cited

U.S. PATENT DOCUMENTS

| | | | | |
|---|---|---|---|---|
| 2011/0267854 A1* | 11/2011 | Flannery | ............... | H04L 12/437 363/72 |
| 2012/0057479 A1* | 3/2012 | Maruyama | ............ | H04J 3/0667 370/252 |

(Continued)

FOREIGN PATENT DOCUMENTS

| JP | 2013042543 A | 2/2013 |
|---|---|---|
| JP | 2014127993 A | 7/2014 |
| JP | 2015068806 A | 4/2015 |

OTHER PUBLICATIONS

Notice of Reasons for Refusal dated Jul. 5, 2022, issued in corresponding Japanese Patent Application No. 2021-514789, 15 pages including 7 pages of English Translation.

(Continued)

*Primary Examiner* — Abdelnabi O Musa
(74) *Attorney, Agent, or Firm* — Buchanan Ingersoll & Rooney PC

(57) ABSTRACT

A communication system includes a master device and a plurality of slave devices. Each slave device stores a synchronization period and a correction amount of a difference between a time of the master device and a time of the slave device. The master device acquires the correction amount from the slave device, calculates a correspondence relationship between a synchronization period and the correction amount based on the correction amount, calculates a target synchronization period in the slave device based on the correspondence relationship, classifies each slave device into a plurality of groups based on the target synchronization period in each slave device, and sets a maximum target synchronization period among the target synchronization periods of at least one slave device classified into each group to a new synchronization period in which the master device performs the time synchronization along with the at least one slave device.

16 Claims, 30 Drawing Sheets

(56) References Cited

U.S. PATENT DOCUMENTS

| | | | | |
|---|---|---|---|---|
| 2013/0170507 | A1* | 7/2013 | Hsueh | H04L 63/04 |
| | | | | 370/503 |
| 2014/0269673 | A1 | 9/2014 | Yin | |
| 2016/0087738 | A1* | 3/2016 | Jeon | H04J 3/0667 |
| | | | | 370/350 |
| 2016/0359575 | A1* | 12/2016 | Ito | H04L 69/28 |
| 2017/0251059 | A1* | 8/2017 | Sawada | H04L 67/125 |
| 2018/0278352 | A1* | 9/2018 | Hoshino | H04L 25/20 |
| 2019/0103989 | A1* | 4/2019 | Kida | B25J 9/1682 |
| 2019/0310308 | A1* | 10/2019 | Hess | G05B 19/0428 |
| 2021/0250160 | A1* | 8/2021 | Ueno | H04L 7/0008 |
| 2021/0356985 | A1* | 11/2021 | Wei | H03L 7/0995 |
| 2022/0300444 | A1* | 9/2022 | Pu | H04W 56/0015 |

OTHER PUBLICATIONS

International Search Report (PCT/ISA/210) with translation and Written Opinion (PCT/ISA/237) dated Dec. 3, 2019, by the Japan Patent Office as the International Searching Authority for International Application No. PCT/JP2019/036616. (13 pages).

* cited by examiner

FIG.20

<REWARD CRITERION J1>

| SUM OF SYNCHRONIZATION PERIODS OF SLAVE DEVICES ≥ SUM OF SYNCHRONIZATION PERIOD THRESHOLDS OF SLAVE DEVICES | REWARD DECREASES |
|---|---|
| SUM OF SYNCHRONIZATION PERIODS OF SLAVE DEVICES < SUM OF SYNCHRONIZATION PERIOD THRESHOLDS OF SLAVE DEVICES | REWARD INCREASES |

<REWARD CRITERION J2>

| \|CORRECTION AMOUNT ACQUIRED FROM EACH SLAVE DEVICE\| > \|TARGET RANGE UPPER LIMIT\| OR \|CORRECTION AMOUNT ACQUIRED FROM EACH SLAVE DEVICE\| < \|TARGET RANGE LOWER LIMIT\| | REWARD DECREASES |
|---|---|
| \|TARGET RANGE LOWER LIMIT\| ≤ \|CORRECTION AMOUNT ACQUIRED FROM EACH SLAVE DEVICE\| ≤ \|TARGET RANGE UPPER LIMIT\| | REWARD INCREASES |

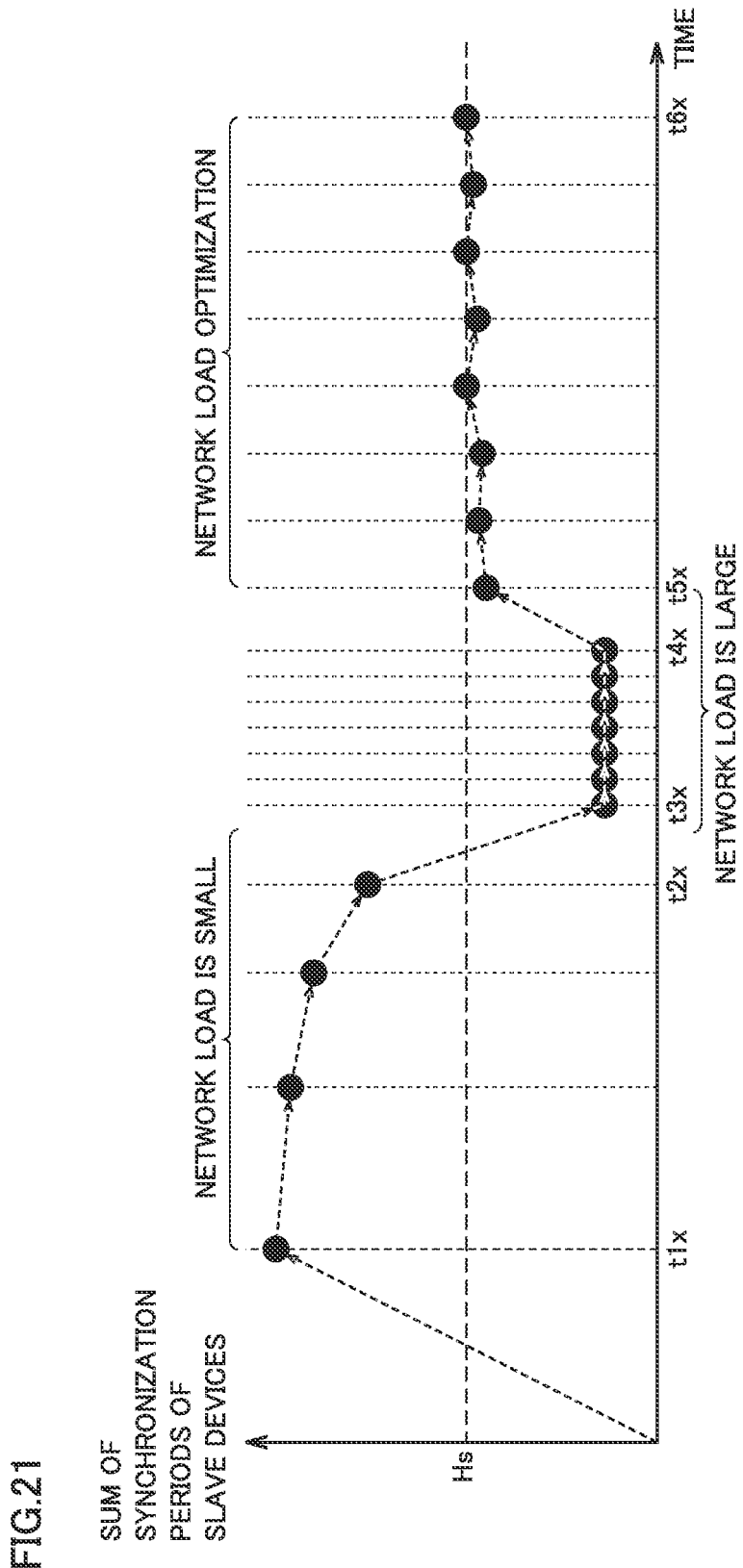

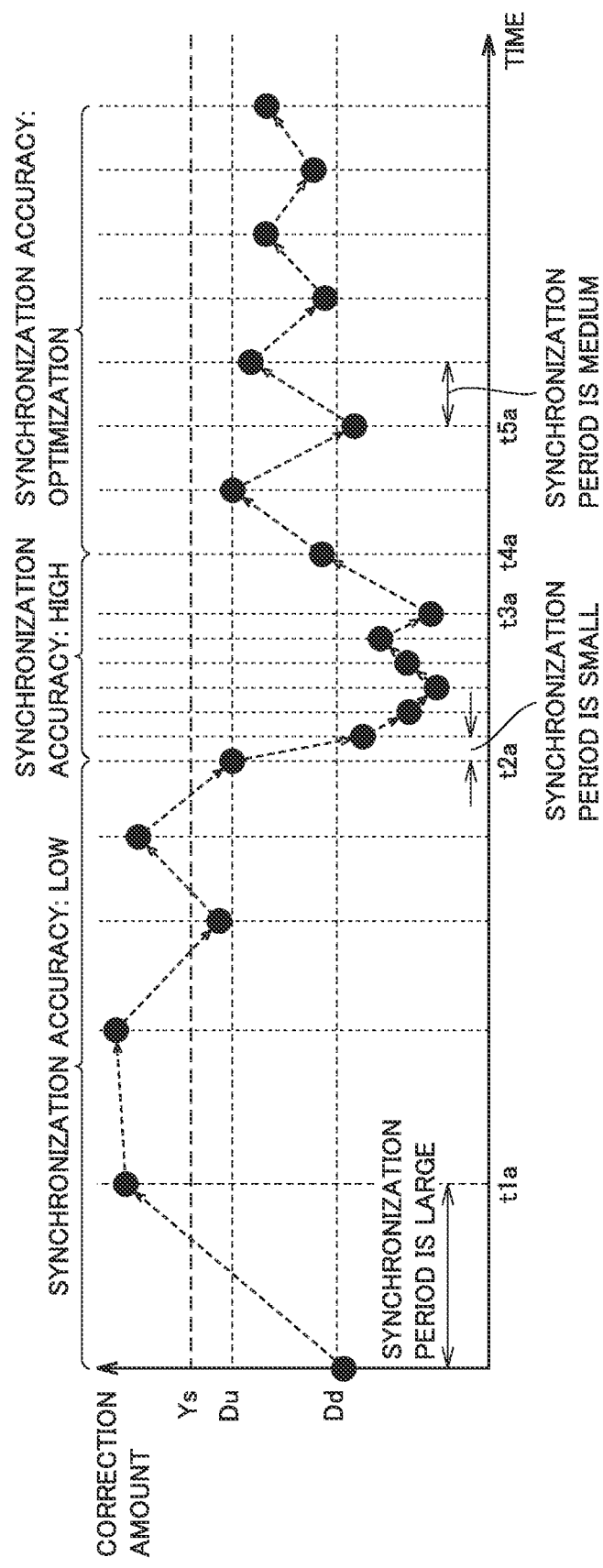

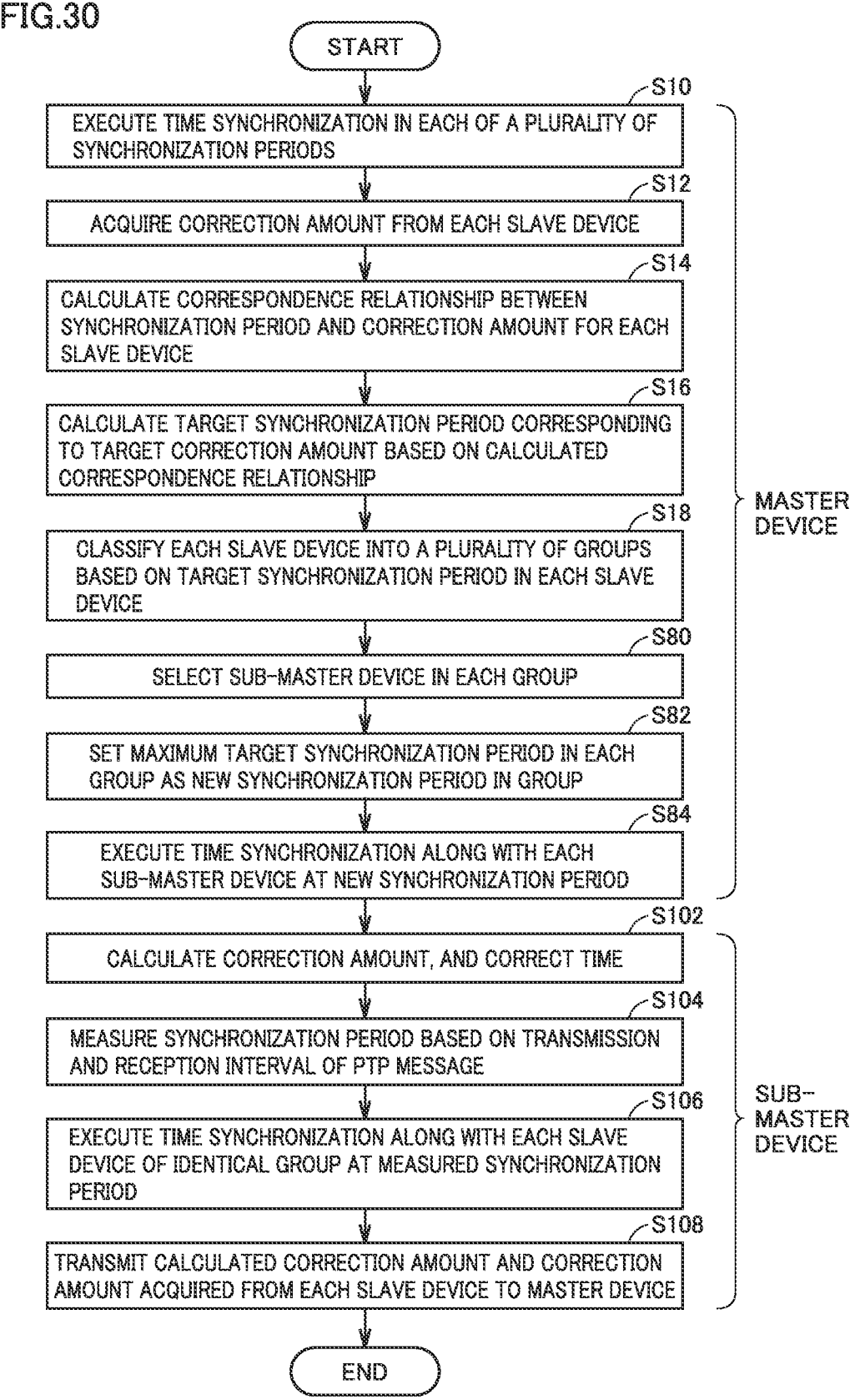

COMMUNICATION SYSTEM, MASTER DEVICE AND SUBMASTER DEVICE

TECHNICAL FIELD

The present disclosure relates to a communication system including a master device and a plurality of slave devices, a master device, a slave device, and a sub-master device.

BACKGROUND ART

Synchronization control or distributed control of each device is required by adjusting a time of each device included in a network with high accuracy. A scheme in which a precision timer protocol (PTP) defined by the IEEE 1588 standard is known as a representative scheme synchronizing the time between devices connected to the network.

For example, Japanese Patent Laying-Open No. 2015-68806A (PTL 1) discloses a time synchronization system including a master device and a plurality of slave devices. In the time synchronization system, the plurality of slave devices receive a first time synchronization message from the master device. The master device receives a second time synchronization message that is a response message to the first time synchronization message from the representative slave device, and transmits a third time synchronization message that is a response message to the second time synchronization message to the time synchronization system. The plurality of slave devices correct the time held by the slave devices based on information included in the first time synchronization message and the third time synchronization message.

CITATION LIST

Patent Literature

PTL 1: Japanese Patent Laying-Open No. 2015-68806A

SUMMARY OF INVENTION

Technical Problems

In study of the time synchronization system of PTL 1, a load on network traffic is reduced without lowering accuracy of time synchronization by the above-described configuration. However, a transmission interval of the PTP message transmitted from the master device is constant, and it is considered that there is room for improvement from this viewpoint.

An object of one aspect of the present disclosure is to reduce a load on a network by reducing the communication traffic of the time synchronization message while the accuracy of the time synchronization is secured in the communication system including the master device and the plurality of slave devices.

Solution to Problem

A communication system according to one aspect includes a master device and a plurality of slave devices to perform time synchronization along with the master device based on a time synchronization message transmitted from the master device. Each slave device stores a correction amount of a difference between the time of the master device and the time of the slave device for each of a plurality of synchronization periods when time synchronization is performed along with the master device at the synchronization period. The master device acquires the correction amount for each synchronization period from each of the slave devices, calculates for each of the plurality of slave devices a correspondence relationship between a synchronization period in which the master device performs the time synchronization along with the slave device and a correction amount of a difference between a time of the master device and a time of the slave device based on each of the correction amounts acquired from the slave device, calculates for each of the plurality of slave devices a target synchronization period corresponding to a target value of the correction amount in the slave device based on the correspondence relationship of the slave device, classifies each of the slave devices into a plurality of groups based on the target synchronization period in each of the slave devices, and sets for each of the plurality of groups a maximum target synchronization period among the target synchronization periods of at least one slave device classified into the group to a new synchronization period in which the master device performs the time synchronization along with the at least one slave device.

According to another aspect, a master device communicable with a plurality of slave devices is provided. The master device acquires from each of the slave devices for each of a plurality of synchronization periods a correction amount of a difference between a time of the master device and a time of the slave device when the time synchronization is performed along with the master device at the synchronization period, calculates for each of the plurality of slave devices a correspondence relationship between a synchronization period in which the master device performs the time synchronization along with the slave device and a correction amount of a difference between a time of the master device and a time of the slave device based on each of the correction amounts acquired from the slave device, calculates for each of the plurality of slave devices a target synchronization period corresponding to a target value of the correction amount in the slave device based on the correspondence relationship of the slave device, classifies each of the slave devices into a plurality of groups based on the target synchronization period in each of the slave devices, and sets for each of the plurality of groups a maximum target synchronization period among the target synchronization periods of at least one slave device classified into the group to a new synchronization period in which the master device performs the time synchronization along with the at least one slave device.

According to still another aspect, a slave device communicable with a master device is provided. The slave device stores for each of a plurality of synchronization periods a correction amount of a difference between a time of the master device and a time of the slave device when time synchronization is performed along with the master device at the synchronization period, transmits the correction amount for each of the synchronization periods to the master device, and performs the time synchronization along with the master device at a new synchronization period set by the master device based on each of the correction amounts.

A communication system according to still another aspect includes a master device and a plurality of slave devices to perform time synchronization along with the master device based on a time synchronization message transmitted from the master device. The master device classifies each of the slave devices into a first plurality of groups based on first classification information, performs for each of the first plurality of groups the time synchronization along with at least one slave device classified into the group at a first synchronization period set for the group, acquires from each of the slave devices a first correction amount of a difference between a time of the master device and a time of the slave device when the time synchronization is performed, and, using a learning model in which each of the first correction amounts, each of the first synchronization periods, and the first classification information are set as input, selects second classification information for classifying each of the slave devices into a second plurality of groups and selects for each of the second plurality of groups a new second synchronization period in which at least one slave device classified into the group and the master device perform the time synchronization for each of the second plurality of groups.

A communication system according to still another aspect includes a master device and a plurality of slave devices to perform time synchronization along with the master device based on a time synchronization message transmitted from the master device. The master device performs the time synchronization along with each of the slave devices at a set synchronization period and acquires, from each of the slave devices, a correction amount of a difference between a time of the master device and a time of the slave device when the time synchronization is performed along with the master device at the synchronization period and selects a new synchronization period in which the time synchronization is performed along with each of the slave devices using a learning model in which each of the acquired correction amounts and the synchronization period are set as input.

According to still another aspect, a master device communicable with a plurality of slave devices is provided. The master device classifies each of the slave devices into a first plurality of groups based on first classification information; performs for each of the first plurality of groups at a first synchronization period set for the group the time synchronization along with at least one slave device classified into the group, acquires from each of the slave devices a first correction amount of a difference between a time of the master device and a time of the slave device when the time synchronization is performed, and, using a learning model in which each of the first correction amounts, each of the first synchronization periods, and the first classification information are set as input, selects second classification information for classifying each of the slave devices into a second plurality of groups and selects for each of the second plurality of groups a new second synchronization period in which at least one slave device classified into the group and the master device perform the time synchronization.

According to still another aspect, a master device communicable with a plurality of slave devices is provided. The master device performs the time synchronization along with each of the slave devices at a set synchronization period and acquires, from each of the slave devices, a correction amount of a difference between a time of the master device and a time of the slave device when the time synchronization is performed along with the master device at the synchronization period and selects a new synchronization period in which the time synchronization is performed along with each of the slave devices using a learning model in which each of the acquired correction amounts and the synchronization period are set as input.

A communication system according to still another aspect includes a master device and a plurality of slave devices to perform time synchronization along with the master device based on a time synchronization message transmitted from the master device. Each slave device stores for each of a plurality of synchronization periods a correction amount of a difference between the time of the master device and the time of the slave device when time synchronization is performed along with the master device at the synchronization period. The master device acquires the correction amount for each synchronization period from each of the slave devices, calculates for each of the plurality of slave devices a correspondence relationship between a synchronization period in which the master device performs the time synchronization along with the slave device and a correction amount of a difference between a time of the master device and a time of the slave device based on each of the correction amounts acquired from the slave device, calculates for each of the plurality of slave devices a target synchronization period corresponding to a target value of the correction amount in the slave device based on the correspondence relationship of the slave device, classifies each of the slave devices into a plurality of groups based on the target synchronization period in each of the slave devices, selects for each of the plurality of groups a sub-master device from at least one slave device classified into the group, and sets for each of the plurality of groups a maximum target synchronization period among the target synchronization periods of at least one slave device classified into the group to a new synchronization period in which the master device performs the time synchronization along with the sub-master device in the group.

According to still another aspect, a sub-master device communicable with a master device and a plurality of slave devices is provided. The sub-master device calculates a first time correction amount indicating a correction amount of a difference between a time of the master device and a time of the sub-master device when time synchronization is performed along with the master device at a set synchronization period, performs the time synchronization along with the plurality of slave devices at the synchronization period, acquires from each of the slave devices a second time correction amount indicating a correction amount of a difference between the time of the sub-master device and the time of the slave device when the time synchronization is performed along with the sub-master device at the synchronization period, and transmits the first time correction amount and each of the second time correction amounts to the master device.

Advantageous Effects of Invention

According to the present disclosure, in the communication system including the master device and the plurality of slave devices, the load on the network can be reduced by reducing the communication traffic of the time synchronization message while the time synchronization accuracy is ensured.

BRIEF DESCRIPTION OF DRAWINGS

FIG. 20 is a diagram illustrating a reward criterion of the fourth embodiment.

FIG. 21 is a diagram illustrating a process in which a network load is reduced by learning of the machine learner.

FIG. 22 is a diagram illustrating a process in which a correction amount of time synchronization converges to a target range by the learning of the machine learner.

FIG. 30 is a flowchart illustrating an example of a processing procedure of a master device and the sub-master device of the sixth embodiment.

DESCRIPTION OF EMBODIMENTS

Figure 1:
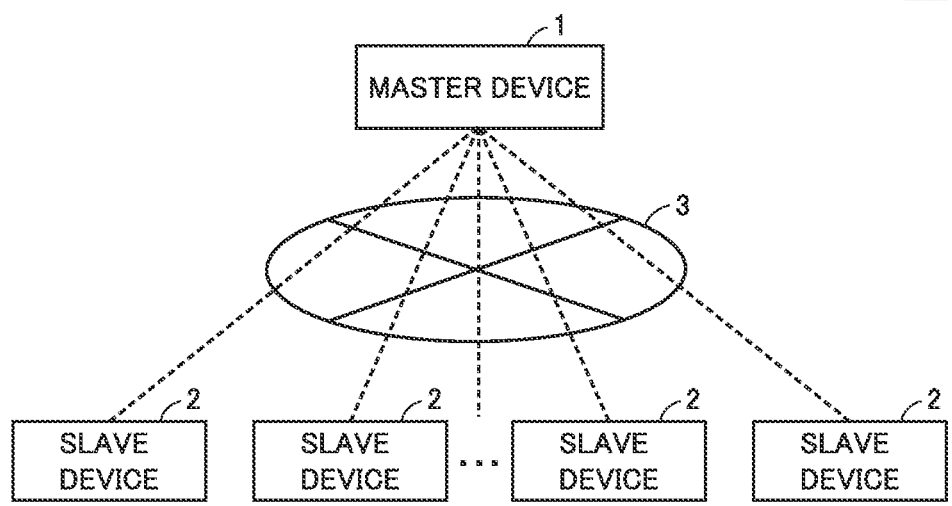
FIG. 1 is a diagram illustrating an example of an overall configuration of a communication system according to a first embodiment.

Hereinafter, embodiments of the present disclosure will be described with reference to the drawings. In the following description, the same component is denoted by the same reference numeral. Those names and functions are the same. Accordingly, the detailed description thereof will not be repeated.

First Embodiment

<System Configuration>

FIG. 1 is a diagram illustrating an example of an overall configuration of a communication system 100 according to a first embodiment. Communication system 100 includes a master device 1 and a plurality of slave devices 2 communicable with master device 1 through a network 3.

Master device 1 is a device that manages time information that becomes a reference of time synchronization in communication system 100, and operates as, for example, a master device of IEEE 1588. Slave device 2 operates as a slave device that executes time synchronization based on a time synchronization message (for example, a PTP message) transmitted from master device 1.

Figure 2:
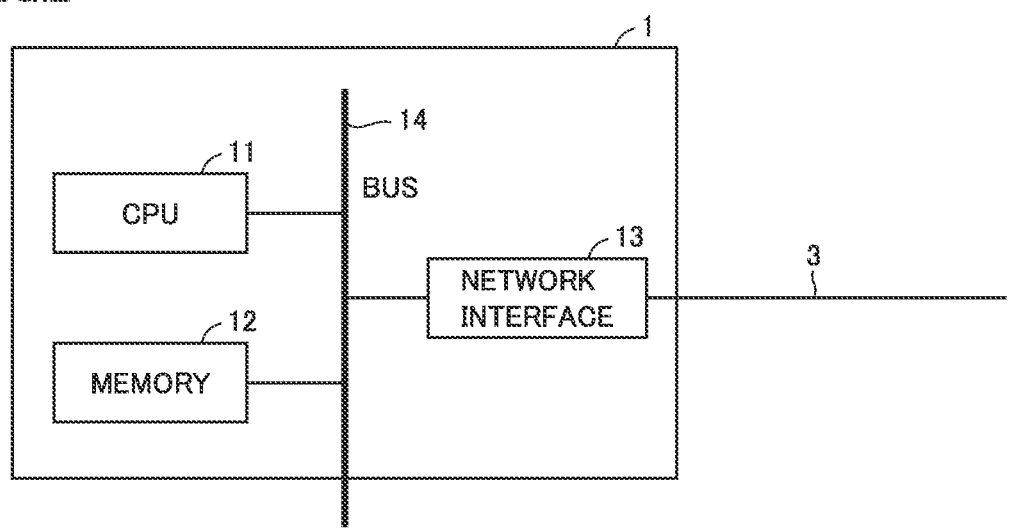
FIG. 2 is a block diagram illustrating a hardware configuration of a display device of the first embodiment.

FIG. 2 is a block diagram illustrating a hardware configuration of master device 1 of the first embodiment. Typically, master device 1 and slave device 2 are a network device having a similar hardware configuration. In this case, the hardware configuration of master device 1 will be described as a representative.

Referring to FIG. 2, master device 1 includes a CPU 11, a memory 12, and a network interface 13. These are coupled by a bus 14.

CPU 11 reads and executes a program stored in memory 12 to control the operation of each unit of master device 1. CPU 11 executes each processing of master device 1 described later by executing the program. Master device 1 may include a plurality of CPUs 11.

Memory 12 is implemented by a random access memory (RAM), a read-only memory (ROM), a flash memory, and the like. Memory 12 stores the program executed by CPU 11, data used by CPU 11, or the like.

Network 3 configured in a wired or wireless manner is connected to a network interface 13. Master device 1 communicates with slave device 2 through network interface 13 and network 3.

Figure 3:
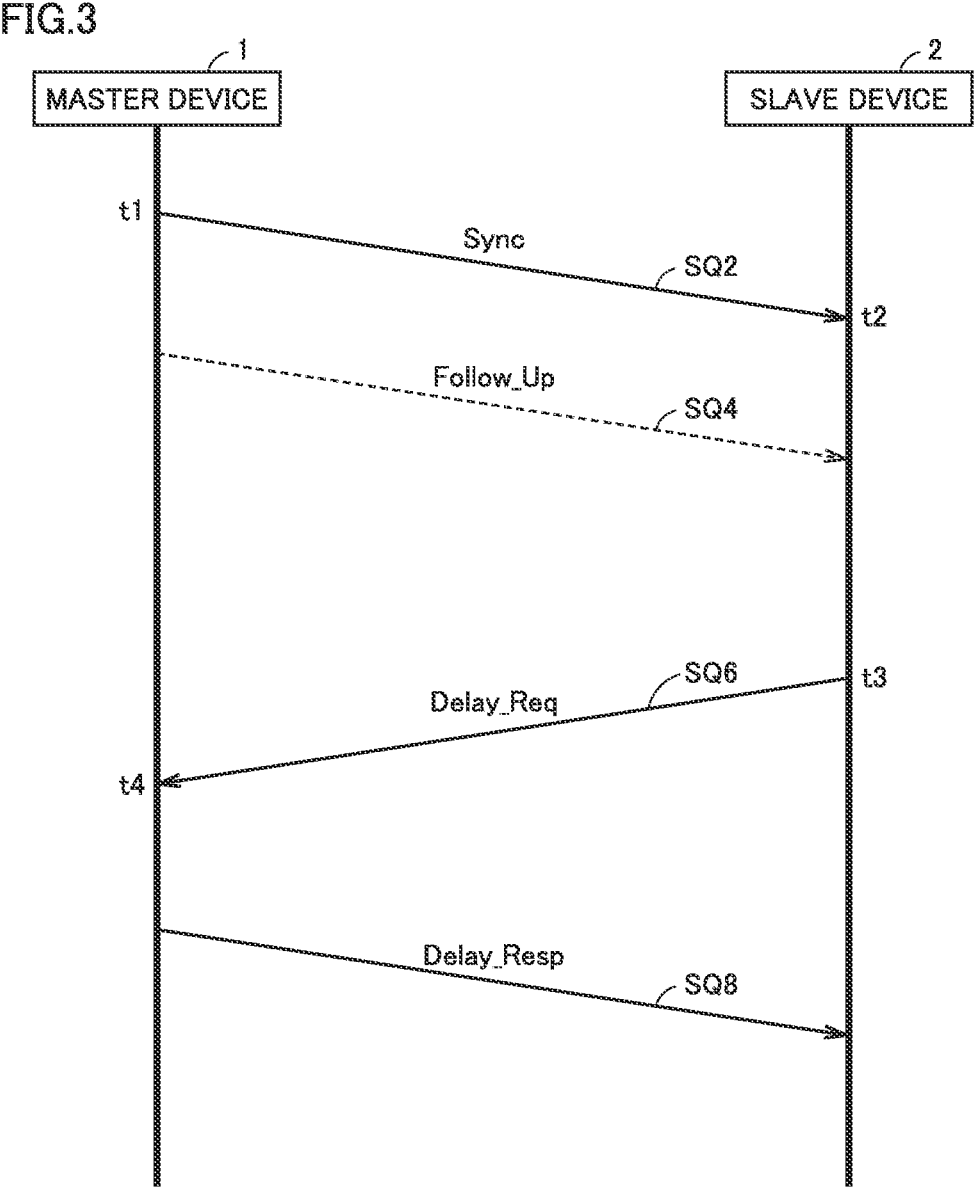
FIG. 3 is a sequence diagram illustrating an example of a procedure of time synchronization between a master device and a slave device of the first embodiment.

FIG. 3 is a sequence diagram illustrating an example of a procedure of time synchronization between master device 1 and slave device 2 of the first embodiment. Specifically, the procedure in FIG. 2 is a time synchronization procedure according to IEEE1588. Each processing in FIG. 2 is mainly executed by CPUs 11 of master device 1 and slave device 2.

Master device 1 transmits a Sync message to slave device 2 (sequence SQ2). At this point, master device 1 stores a transmission time t1 of the Sync message in memory 12. Slave device 2 receives the Sync message and stores a reception time t2 of the Sync message in memory 12.

Master device 1 reads transmission time t1 of the Sync message from memory 12, and transmits a Follow_Up message in which transmission time t1 is stored to slave device 2 (sequence SQ4). Slave device 2 stores transmission time t1 stored in the received Follow_Up message in memory 12. Master device 1 may be configured to transmit the Sync message in which transmission time t1 is stored to slave device 2.

Slave device 2 transmits a Delay_Req message to master device 1 (sequence SQ6). Slave device 2 stores transmission time t3 of the Delay_Req message in memory 12. Master device 1 receives the Delay_Req message and stores a reception time t4 of the Delay_Req message.

Master device 1 transmits the Delay_Resp message in which reception time t4 is stored to slave device 2 (sequence SQ8). Slave device 2 stores the reception time t4 stored in the received Delay_Resp message in memory 12.

According to the above-described sequence, transmission times t1, t3 and reception times t2, t4 are stored in memory 12 of slave device 2.

Slave device 2 calculates difference (that is, "t2−t1") between transmission time t1 and reception time t2 to acquire a sum of a time gap between master device 1 and slave device 2 and transmission path delay for a transmission path from master device 1 to slave device 2. Furthermore, slave device 2 calculates difference (that is, "t4−t3") between transmission time t3 and reception time t4 to acquire a sum of the time gap between master device 1 and slave device 2 and transmission path delay for the transmission path from slave device 2 to master device 1.

The sum of the time difference "t4−t3" and the time difference "t2−t1" corresponds to twice the transmission path delay. The difference between the time difference "t4−t3" and the time difference "t2−t1" corresponds to twice the time gap between the time (hereinafter, also referred to as "master time") of master device 1 and the time (hereinafter, also referred to as "slave time" of slave device 2. At this point, in the delay calculation of the transmission path of the IEEE 1588 protocol, it is assumed that the transmission delay between master device 1 and slave device 2 is equivalent in an outward path and a return path. Accordingly, a delay time td of the transmission path in a single direction is expressed by the following equation (1).

$$td=\{(t4-t3)+(t2-t1)\}/2 \quad (1)$$

A time difference tdiff between the master time and the slave time is expressed by the following equation (2).

$$tdiff=\{(t4-t3)-(t2-t1)\}/2 \quad (2)$$

Slave device 2 executes the time synchronization along with master device 1 by correcting the time of slave device 2 using the time difference tdiff as a correction amount of the time synchronization.

As described above, in the time synchronization between master device 1 and slave device 2, even in a case where the round-trip delays of the PTP message are equal to each other or the time difference between the round-trip delays exists, it is assumed that the time difference is known.

However, the delay time td and the time difference tdiff vary in each time measurement due to factors such as jitter of a clock oscillator included in the network interface 13 of each device, replacement from the network 3 to a clock in each device, and a temperature change in a surrounding environment in which each device is used. For this reason, in order to prevent the gap between the master time and the slave time and secure accuracy of the time synchronization between master device 1 and slave device 2, it is necessary to periodically execute processing related to the time synchronization in FIG. 3 between master device 1 and slave device 2.

On the other hand, in order to maintain high time synchronization accuracy in a network configuration in which a large number of slave devices 2 are connected to master device 1, it is necessary to perform time correction of the master time and the slave time by executing processing related to time synchronization in a short cycle. In this case, a network load increases because the PTP message is frequently transmitted and received between master device 1 and each slave device 2.

For this reason, in the communication system 100 of the first embodiment, the following processing is executed. First, master device 1 performs the time synchronization along with each slave device 2 at a certain synchronization period. Each slave device 2 stores a correction amount of the time difference between the master time and the slave time when the time synchronization is performed at the synchronization period. Similar time synchronization is performed in other synchronization periods, and each slave device 2 stores other correction amounts.

Master device 1 obtains a correspondence relationship between the synchronization period and the correction amount for each slave device 2 based on a plurality of correction amounts acquired from each slave device 2. Master device 1 calculates a target synchronization period corresponding to a target value (hereinafter, also referred to as "a target correction amount") of the correction amount for each slave device 2 based on the correspondence relationship in each slave device 2. The target correction amount corresponds to maximum allowable time difference between the master time and the slave time. In other words, the target correction amount is required time synchronization accuracy.

Master device 1 classifies each slave device 2 into a plurality of groups based on the target synchronization period in each slave device 2. For each group, master device 1 sets the maximum target synchronization period among the target synchronization periods in the plurality of slave devices 2 classified into the group to a new synchronization period in which the plurality of slave devices 2 perform the time synchronization along with master device 1. As a result, the synchronization period between master device 1 and each slave device 2 is optimized as a whole, and the network load can be reduced while the time synchronization accuracy is ensured. Hereinafter, the configuration and processing of communication system 100 will be described in more detail.

<Synchronization Period Setting Scheme>

Figure 4:
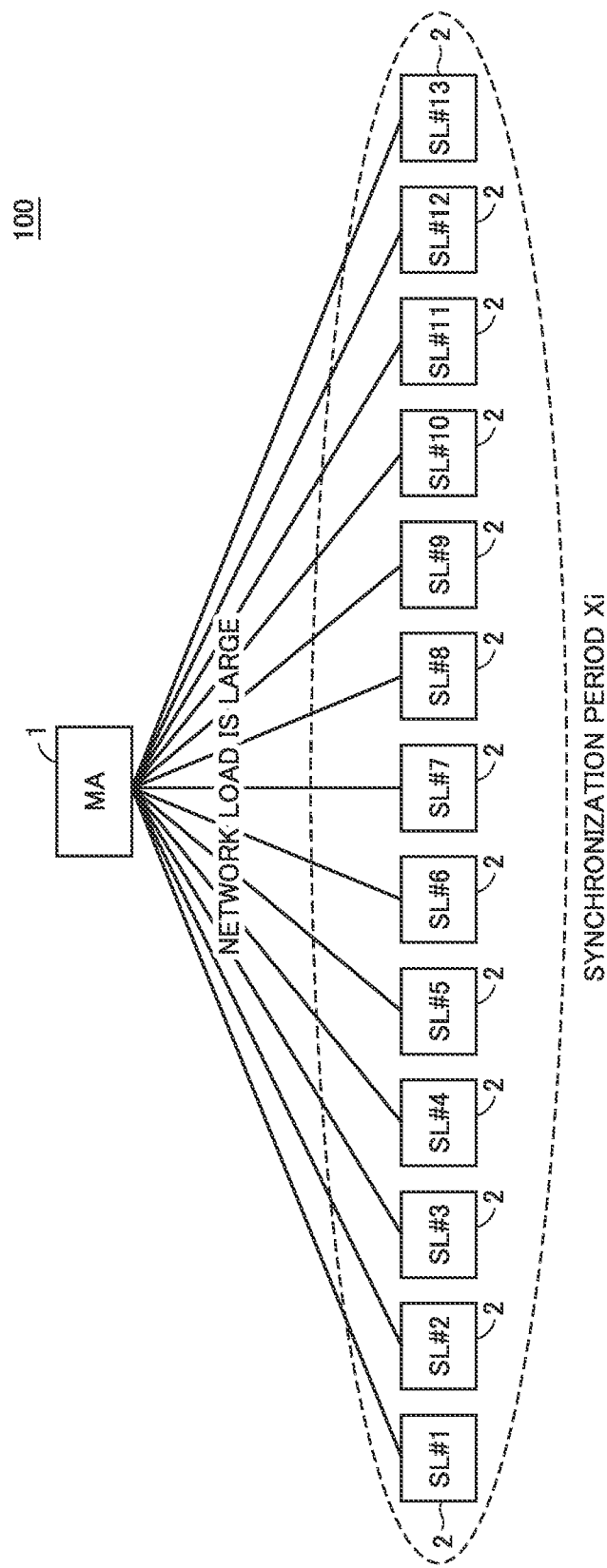
FIG. 4 is a diagram illustrating a configuration of an initial state in the communication system of the first embodiment.

FIG. 4 is a diagram illustrating a configuration of an initial state in communication system 100 of the first embodiment. In FIG. 4, "MA" represents a master device, and "SL" represents a slave device. Hereinafter, for ease of explanation, it is assumed that communication system 100 includes 13 slave devices 2, and for convenience, numbers #1 to #13 are assigned to 13 slave devices 2 to distinguish slave devices 2 from one another. Specifically, 13 slave devices 2 are also referred to as slaves #1 to #13, respectively.

FIG. 4 illustrates an example in which master device 1 and slaves #1 to #13 execute the time synchronization in the same synchronization period Xi. In this case, because the synchronization period between master device 1 and each of slaves #1 to #13 is not optimized, the network load increases when the time synchronization accuracy is secured.

For this reason, processing of optimizing the synchronization period between master device 1 and each slave device 2 is executed in communication system 100. First, master device 1 performs the time synchronization along with each of slaves #1 to #13 in each of a plurality of synchronization periods (for example, synchronization periods X1, X2, X3). Typically, master device 1 executes the time synchronization along with slaves #1 to #13 a plurality of times at the synchronization periods X1 to X3.

The synchronization period is changed so as not to exceed the maximum synchronization period with which the time synchronization accuracy (for example, ±1 μs) can be secured. Specifically, each of the synchronization periods X1 to X3 is shorter than the maximum synchronization period. The maximum synchronization period is a theoretical value calculated in consideration of variation factors of the master time and each slave time due to clock accuracy of an oscillator, replacement of the clock in an elastic buffer, and the like.

Each of slaves #1 to #13 stores a correction amount Y1 corresponding to the time difference between the master time and the slave time calculated using the equation (2) in association with the synchronization period X1 when the time synchronization is executed at the synchronization period X1.

Similarly, each of slaves #1 to #13 stores a correction amount Y2 calculated when the time synchronization is executed in a synchronization period X2 in association with the synchronization period X2, and stores a correction amount Y3 calculated when the time synchronization is executed at a synchronization period X3 in association with the synchronization period X3. Typically, because the time synchronization is executed the plurality of times for one synchronization period, each of slaves #1 to #13 stores correction amounts Y1 to Y3 for the plurality of times.

Master device 1 acquires correction amounts Y1 to Y3 for the plurality of times from slaves #1 to #13. Master device 1 obtains the correspondence relationship between the synchronization period and the correction amount for each of slaves #1 to #13 based on correction amounts Y1 to Y3 for the plurality of times.

Figure 5:
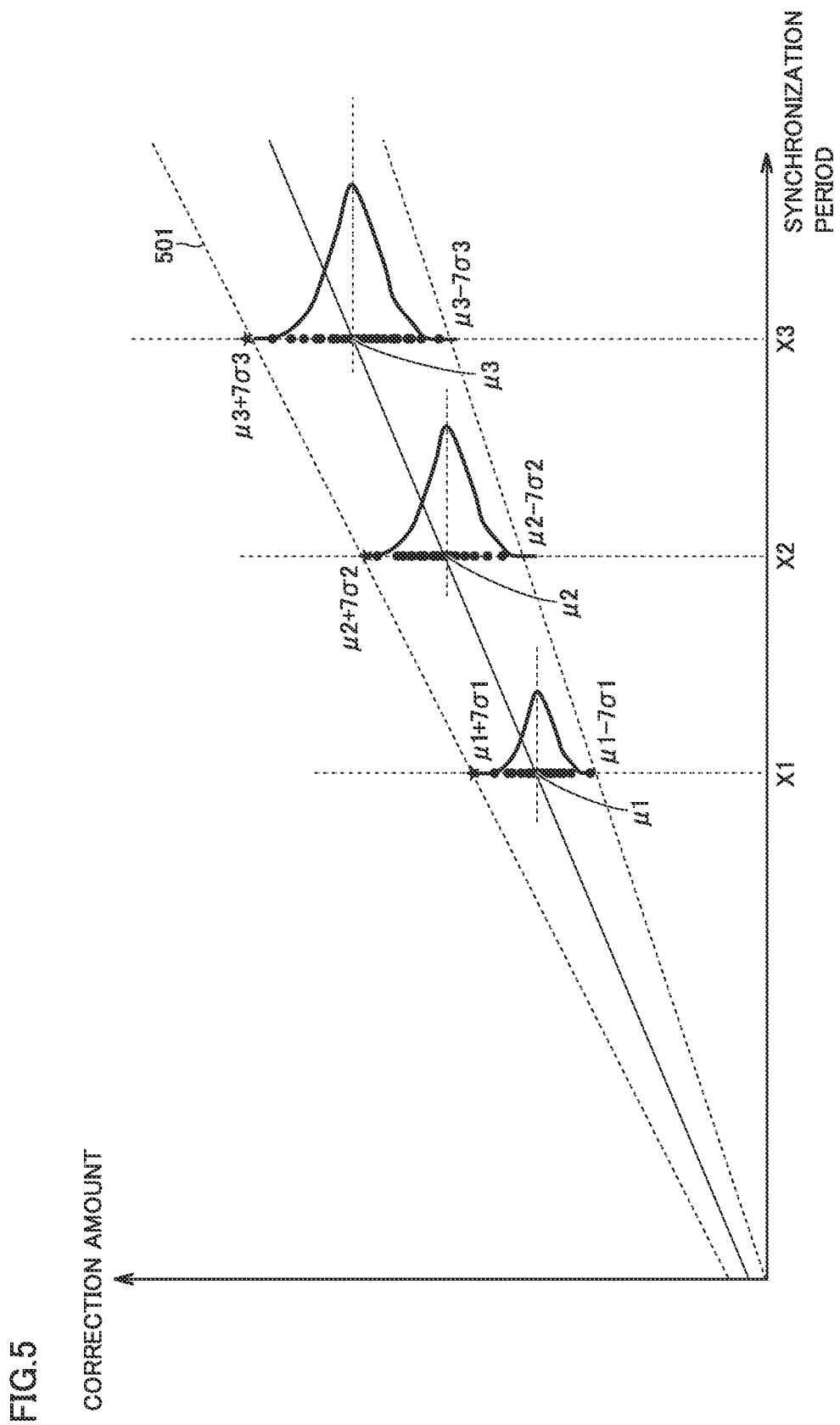
FIG. 5 is a scatter diagram illustrating a relationship between a synchronization period and a correction amount for a single slave device.

FIG. 5 is a scatter diagram illustrating the relationship between the synchronization period and the correction amount for a single slave device. A horizontal axis indicates the synchronization period, and a vertical axis indicates an absolute value of the correction amount of the time synchronization. For ease of explanation, the correction amount is converted into the absolute value. However, the correction amount may not be converted into the absolute value. In the following description, the absolute value of the correction amount is simply referred to as "a correction amount". In FIG. 5, for example, a scheme of calculating the correspondence relationship between the synchronization period and the correction amount for the slave #1 will be described.

Referring to FIG. 5, a plurality of points indicating correction amount Y1 corresponding to synchronization period X1 are plotted. The plurality of points correspond to correction amount Y1 for the plurality of times. Similarly, a plurality of points indicating correction amount Y2 corresponding to synchronization period X2 and a plurality of points indicating correction amount Y3 corresponding to synchronization period X3 are plotted.

At this point, it is assumed that variations in correction amounts Y1 to Y3 calculated by slave #1 follow a Gaussian distribution. Master device 1 calculates an average value $\mu 1$ and a standard deviation $\sigma 1$ of the plurality of correction amounts Y1, an average value $\mu 2$ and a standard deviation $\sigma 2$ of the plurality of correction amounts Y2, and an average value $\mu 3$ and a standard deviation $\sigma 3$ of the plurality of correction amounts Y3.

Master device 1 obtains a linear function obtained by linearly approximating an addition value of an average value and a standard deviation with respect to the synchronization period. Specifically, master device 1 obtains a linear function 501 obtained by linearly approximating a coordinate point $(X1, \mu 1+N \times \sigma 1)$, a coordinate point $(X2, \mu 2+N \times \sigma 2)$, and a coordinate point $(X3, \mu 3+N \times \sigma 3)$. In the example of FIG. 5, N=7. However, N>0 may be satisfied.

"$\mu 1+N \times \sigma 1$" corresponds to a limit value that allows a deviation of correction amount Y1, "$\mu 2+N \times \sigma 2$" corresponds to a limit value that allows a deviation of correction amount Y2, and "$\mu 3+N \times \sigma 3$" corresponds to a limit value that allows a deviation of correction amount Y3. As N increases, a probability that the correction amount is included within the limit value increases (that is, the probability of deviating from the limit value becomes small). The value of N may be appropriately determined according to an allowable amount of variation in the correction amount.

Figure 6:
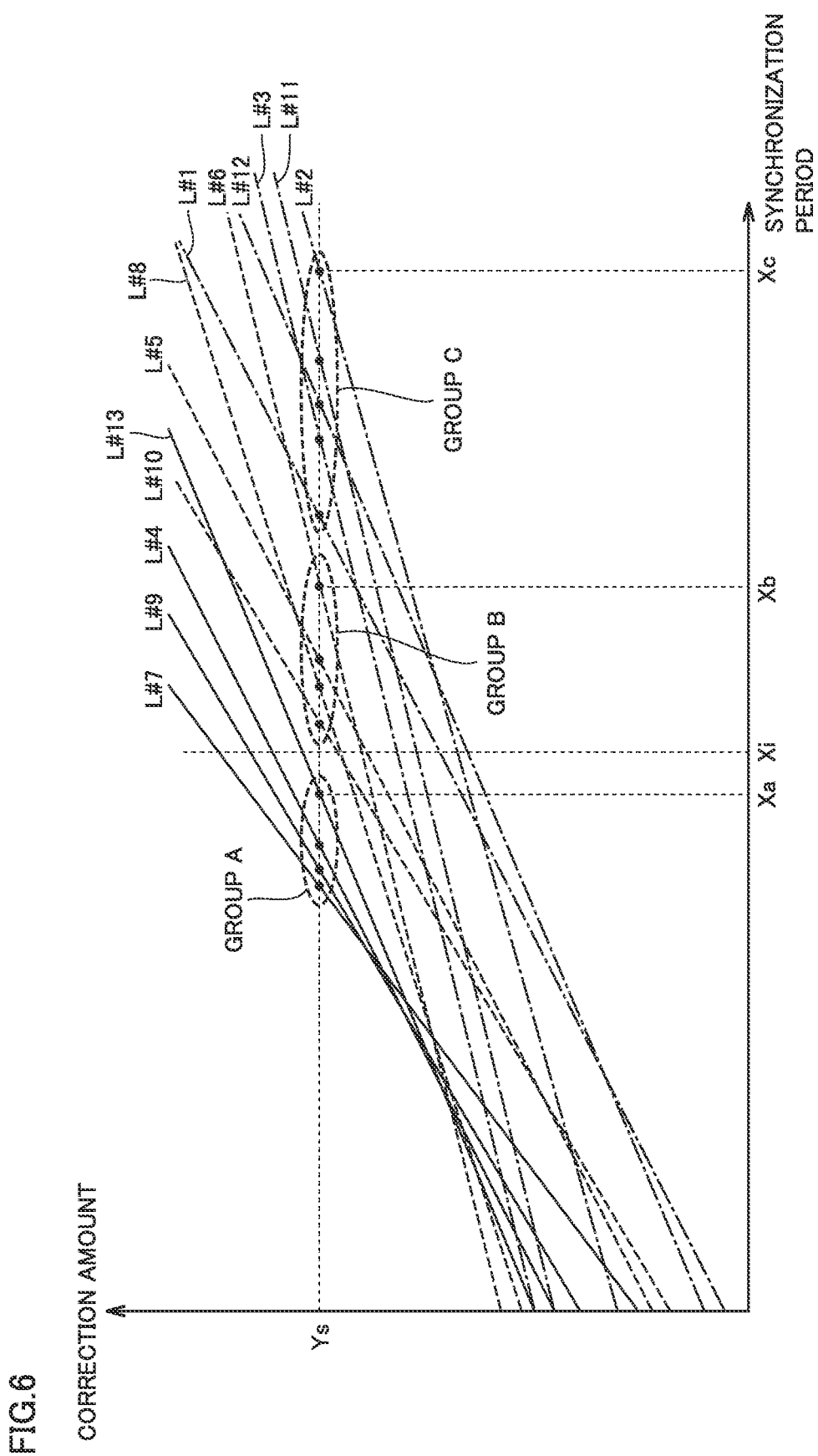
FIG. 6 is a scatter diagram illustrating the relationship between the synchronization period and the correction amount for each slave device.

FIG. 6 is a scatter diagram illustrating the relationship between the synchronization period and the correction amount for each slave device. Master device 1 executes the processing in FIG. 5 for each of slaves #1 to #13. Then, as illustrated in FIG. 6, 13 linear functions are obtained in slaves #1 to #13. In FIG. 6, the linear function corresponding to the slave #m is indicated by "L #m". For example, linear function 501 in slave #1 of FIG. 5 corresponds to a linear function L #1 in FIG. 6.

Master device 1 sets a target correction amount Ys that is a target value of the correction amount. Specifically, target correction amount Ys corresponds to required (that is, target) time synchronization accuracy. Master device 1 obtains an intersection of each of linear functions L #1 to L #13 and target correction amount Ys. In FIG. 6, each intersection is indicated by a black circle. At this point, the synchronization period at an intersection P #m between linear function L #m and target correction amount Ys is represented by a target synchronization period X #m. For example, a coordinate of the intersection P #1 is (X #1, Ys).

Master device 1 classifies slaves #1 to #13 into a plurality of groups using target synchronization periods X #1 to #13. In the classification, for example, a k-means method that is an algorithm of cluster analysis is used. The number of groups to be produced is H. The number of groups varies depending on the algorithm to be applied.

1) First, an arbitrary group is randomly allocated to each of slaves #1 to #13. Subsequently, 2) Vj (1≤j≤H), which is a cluster center corresponding to each of the H groups, is calculated. The cluster center is an average value of the feature amounts of all the slaves belonging to the corresponding group. In this case, the feature amount is the target synchronization period. Furthermore, 3) the distance between the feature amount of each of slaves #1 to #13 and each Vj is calculated, and each of slaves #1 to #13 is reallocated to the group corresponding to the closest Vj among the respective Vjs.

When the allocation of the groups of all slaves #1 to #13 is not changed in the pieces of processing of 1) to 3) (that is, for each of slaves #1 to #13, the case in which the group to which the slave is allocated is matched with the group to which the slave is already allocated), it is determined that convergence occurs, and the classification processing is ended. Otherwise, cluster center Vj of the newly allocated group is recalculated, and the processing of 3) is repeated.

With such classification processing, master device 1 classifies slaves #1 to #13 into a plurality of groups. In the example of FIG. 6, slaves #1 to #13 are classified into three groups A to C. Specifically, slaves #4, #7, #9, #13 are classified into group A, slaves #5, #6, #8, #10 are classified into group B, and slaves #1, #2, #3, #11, #12 are classified into group C.

For each of groups A to C, master device 1 calculates the maximum target synchronization period among the target synchronization periods of all the slaves classified into the group. Specifically, maximum target synchronization period Xa among target synchronization periods X #4, X #7, X #9, X #13 in slaves #4, #7, #9, #13 classified as group A is the target synchronization period X #13. Similarly, maximum target synchronization period Xb in group B is target synchronization period X #6, and maximum target synchronization period Xc in group C is target synchronization period X #2.

Master device 1 sets target synchronization period Xa to a new synchronization period in which the time synchronization is executed along with slaves #4, #7, #9, #13 belonging to group A. In addition, master device 1 sets target synchronization period Xb as a new synchronization period in which the time synchronization is executed along with slaves #5, #6, #8, #10 belonging to group B, and sets target synchronization period Xc as a new synchronization period in which the time synchronization is executed along with slaves #1, #2, #3, #11, #12 belonging to group C. The reason why the maximum target synchronization period is set as the new synchronization period in each group is that each slave device 2 in the group can reliably satisfy the target value of the correction amount.

Then, master device 1 transmits and receives the PTP message to and from each slave device 2 belonging to group A at new synchronization period Xa to execute the time synchronization. Similarly, master device 1 executes the time synchronization along with each slave device 2 belonging to group B at synchronization period Xb, and executes the time synchronization along with each slave device 2 belonging to group C at synchronization period Xc. In this manner, master device 1 executes the time synchronization in different synchronization periods for each group.

Figure 7:
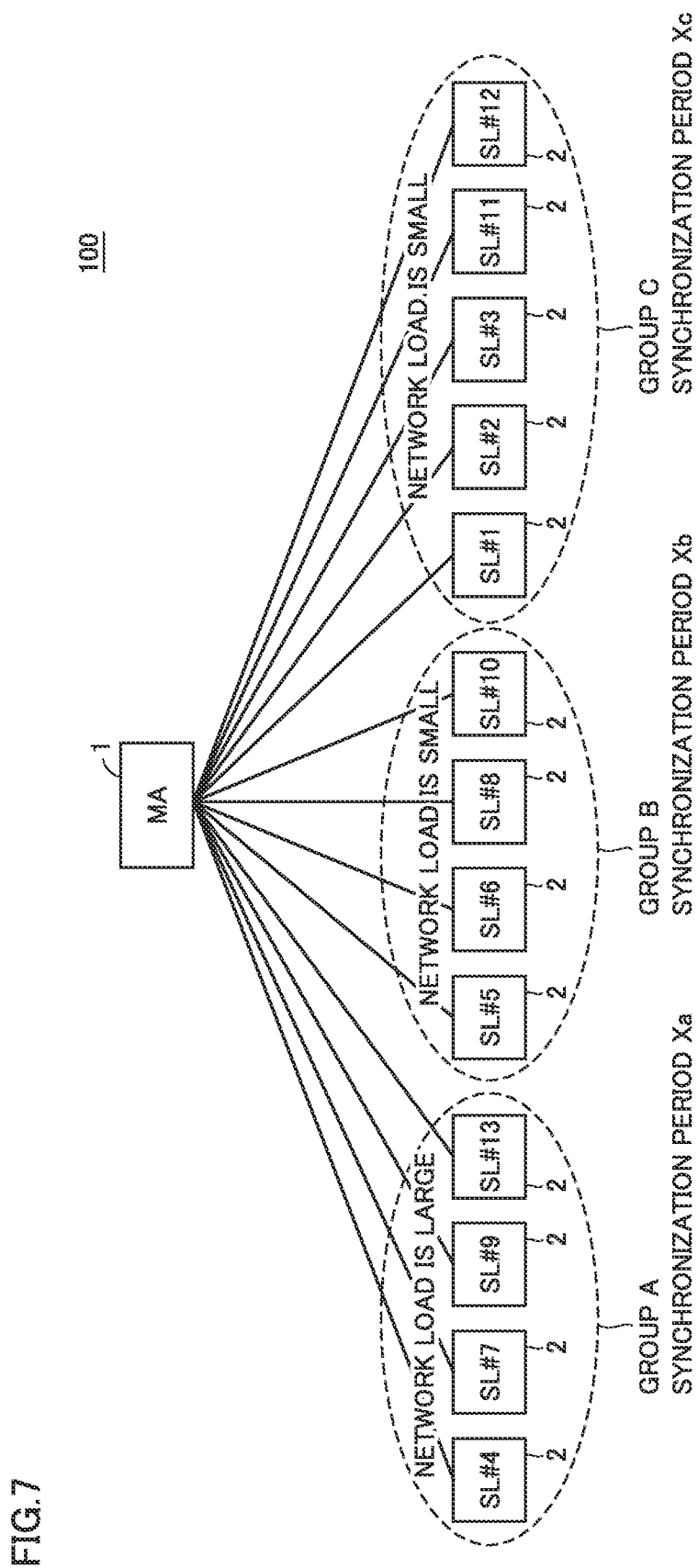
FIG. 7 is a diagram illustrating a configuration in a state in which the synchronization period is optimized in the communication system of the first embodiment.

FIG. 7 is a diagram illustrating a configuration in a state in which the synchronization period is optimized in communication system 100 of the first embodiment. As illustrated in FIG. 4, in the configuration in the initial state of communication system 100, master device 1 executes the time synchronization along with slaves #1 to #13 at synchronization period Xi. As illustrated in FIG. 6, synchronization period Xa is slightly shorter than synchronization period Xi. For this reason, the network load (that is, the communication traffic of the PTP message) slightly increases when the time synchronization is executed between master device 1 and each slave device 2 belonging to group A.

However, because synchronization period Xb is longer than synchronization period Xi and synchronization period Xc is considerably longer than synchronization period Xi, the network load is considerably reduced when time synchronization is executed between master device 1 and each slave devices 2 belonging to groups B and C. Accordingly, according to communication system 100 of the first embodiment, the communication traffic of the PTP message between master device 1 and each slaves #1 to #13 can be reduced as a whole, and the network load can be reduced.

<Functional Configuration>

Figure 8:
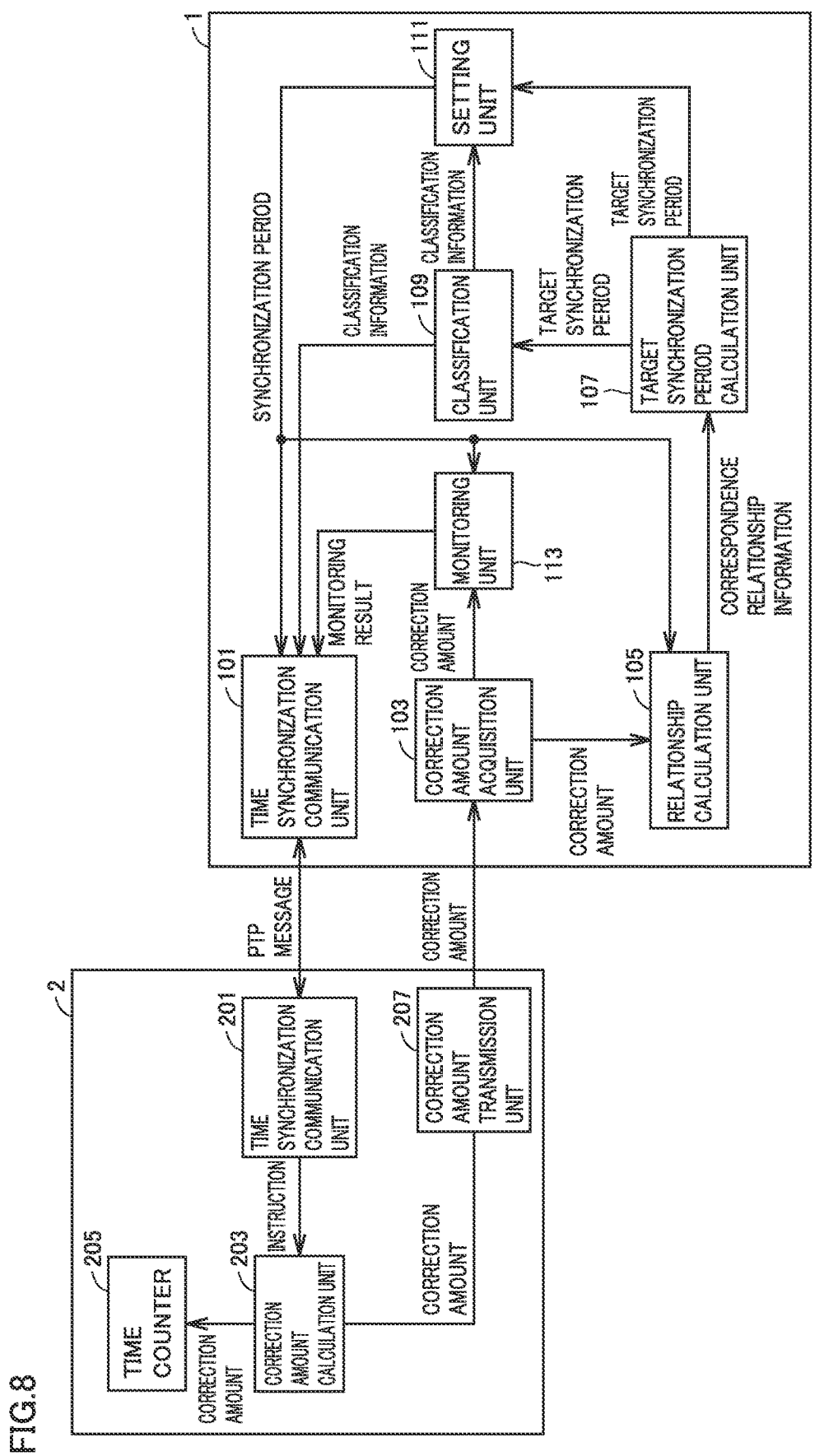
FIG. 8 is a schematic diagram illustrating a functional configuration of the master device of the first embodiment.

FIG. 8 is a schematic diagram illustrating a functional configuration of master device 1 of the first embodiment. Referring to FIG. 8, master device 1 includes, as a main functional configuration, a time synchronization communication unit 101, a correction amount acquisition unit 103, a relationship calculation unit 105, a target synchronization period calculation unit 107, a classification unit 109, and a setting unit 111. Typically, CPU 11 executes the program stored in memory 12, thereby implementing these functions. Some or all of these functions may be implemented using a dedicated circuit.

Slave device 2 includes a time synchronization communication unit 201, a correction amount calculation unit 203, a time counter 205, and a correction amount transmission unit 207. Typically, CPU of slave device 2 executes the program stored in the memory, thereby implementing these functions. Some or all of these functions may be implemented using a dedicated circuit.

The time synchronization communication unit 101 executes the time synchronization along with time synchronization communication unit 201 of each slave device 2 in each of the plurality of synchronization periods (for example, synchronization periods X1 to X3). Specifically, time synchronization communication unit 101 transmits and receives the PTP message to and from time synchronization communication unit 201 of each slave device 2 according to the sequence in FIG. 3.

Time synchronization communication unit 201 gives a calculation instruction of the correction amount of the time difference between the master time and the slave time to correction amount calculation unit 203 according to the received PTP message. According to the calculation instruction, correction amount calculation unit 203 calculates the correction amount of the time difference between the master time and the slave time when the time synchronization is executed along with master device 1 in each of the plurality of synchronization periods.

Time counter 205 executes the time synchronization along with master device 1 by correcting the time of slave device 2 using the calculated correction amount of the time synchronization. Correction amount transmission unit 207 transmits the correction amount for each of the plurality of synchronization periods to master device 1. Each slave device 2 stores the correction amount of the time difference between the master time and the slave time when the time synchronization is executed along with master device 1 in each of the plurality of synchronization periods. As an example, each slave device 2 stores each correction amount in memory 12.

Typically, time synchronization communication unit 101 executes the time synchronization along with each slave device 2 the plurality of times for each synchronization period. Accordingly, each slave device 2 executes the time synchronization along with master device 1 the plurality of times for each of the plurality of synchronization periods, and stores each of the correction amounts of the plurality of times.

Correction amount acquisition unit 103 acquires the correction amount for each synchronization period from each slave device 2. Specifically, correction amount acquisition unit 103 receives each correction amount transmitted from each slave device 2 through network interface 13.

Relationship calculation unit 105 calculates, for each slave device 2, a correspondence relationship between the synchronization period in which master device 1 executes the time synchronization along with slave device 2 and the correction amount of the time difference between the master time and the slave time based on each correction amount acquired from slave device 2.

Specifically, relationship calculation unit 105 calculates, for each of the plurality of slave devices 2, the correspondence relationship in slave device 2 based on each of the correction amounts of the plurality of times acquired from slave device 2. The correspondence relationship in slave device 2 is the linear function (for example, linear function 501) obtained by linearly approximating the addition value (for example, $\mu+N\times\sigma$) of the average value and the standard deviation of the correction amounts of the plurality of times with respect to the synchronization period in which slave device 2 executes the time synchronization along with master device 1.

Target synchronization period calculation unit 107 calculates, for each of the plurality of slave devices 2, the target synchronization period (for example, target synchronization periods X #1 to X #13) corresponding to target correction amount Ys in slave device 2 based on the correspondence relationship of slave device 2. Specifically, for each of the plurality of slave devices 2, target synchronization period calculation unit 107 calculates the target synchronization period in slave device 2 based on the linear function and the target correction amount Ys in slave device 2.

Classification unit 109 classifies slave devices 2 into the plurality of groups (for example, groups A to C) based on the target synchronization period (for example, target synchronization periods X #1 to X #13) in each slave device 2. Specifically, classification unit 109 calculates, for each of the plurality of slave devices 2, the distance between the target synchronization period in slave device 2 and the cluster center corresponding to each group, and classifies the slave device into the group corresponding to the cluster center for which the distance is smallest. For example, classification unit 109 classifies each slave device 2 into any one of the plurality of groups according to the above-described classification procedure. Classification unit 109 outputs classification information indicating which group each slave device 2 is classified into to setting unit 111. For example, the classification information includes the number of groups, the number of slave devices 2 belonging to each group, and identification information (for example, device numbers #1 to #13) about slave devices 2 belonging to each group.

Setting unit 111 calculates, for each of the plurality of groups, the maximum target synchronization period (for example, target synchronization period Xa) among the target synchronization periods in at least one slave device 2 classified into the group (for example, group A). Setting unit 111 sets the maximum target synchronization period as the new synchronization period in which master device 1 executes the time synchronization along with the at least one slave device. Time synchronization communication unit 101 executes the time synchronization along with the plurality of slave devices 2 belonging to each group at the new synchronization period set for each group by setting unit 111.

Time synchronization communication unit 201 of slave device 2 executes the time synchronization along with master device 1 at the new synchronization period set by master device 1 based on each correction amount. Correction amount calculation unit 203 calculates the correction amount when the time synchronization is executed at the new synchronization period. Correction amount transmission unit 207 transmits the correction amount to master device 1.

After setting unit 111 of master device 1 sets the new synchronization period, correction amount acquisition unit 103 acquires the correction amount from each slave device 2. Specifically, correction amount acquisition unit 103 acquires the correction amount when the time synchronization is executed at the new synchronization period.

A monitoring unit 113 monitors whether at least one of the plurality of correction amounts acquired from the plurality of slave devices 2 is greater than or equal to target correction amount Ys. Monitoring unit 113 outputs a monitoring result to time synchronization communication unit 101. That is, when the time synchronization is executed with the newly set synchronization period, monitoring unit 113 monitors whether the requested time synchronization accuracy is satisfied.

When receiving the input of the monitoring result that at least one of the correction amounts is greater than or equal to target correction amount Ys, time synchronization communication unit 101 executes the time synchronization along with each slave device 2 again in each of the plurality of synchronization periods. Hereinafter, the pieces of processing of correction amount acquisition unit 103, relationship calculation unit 105, target synchronization period calculation unit 107, classification unit 109, and setting unit 111 are executed again, so that the new synchronization period is set again.

<Processing Procedure>

Figure 9:
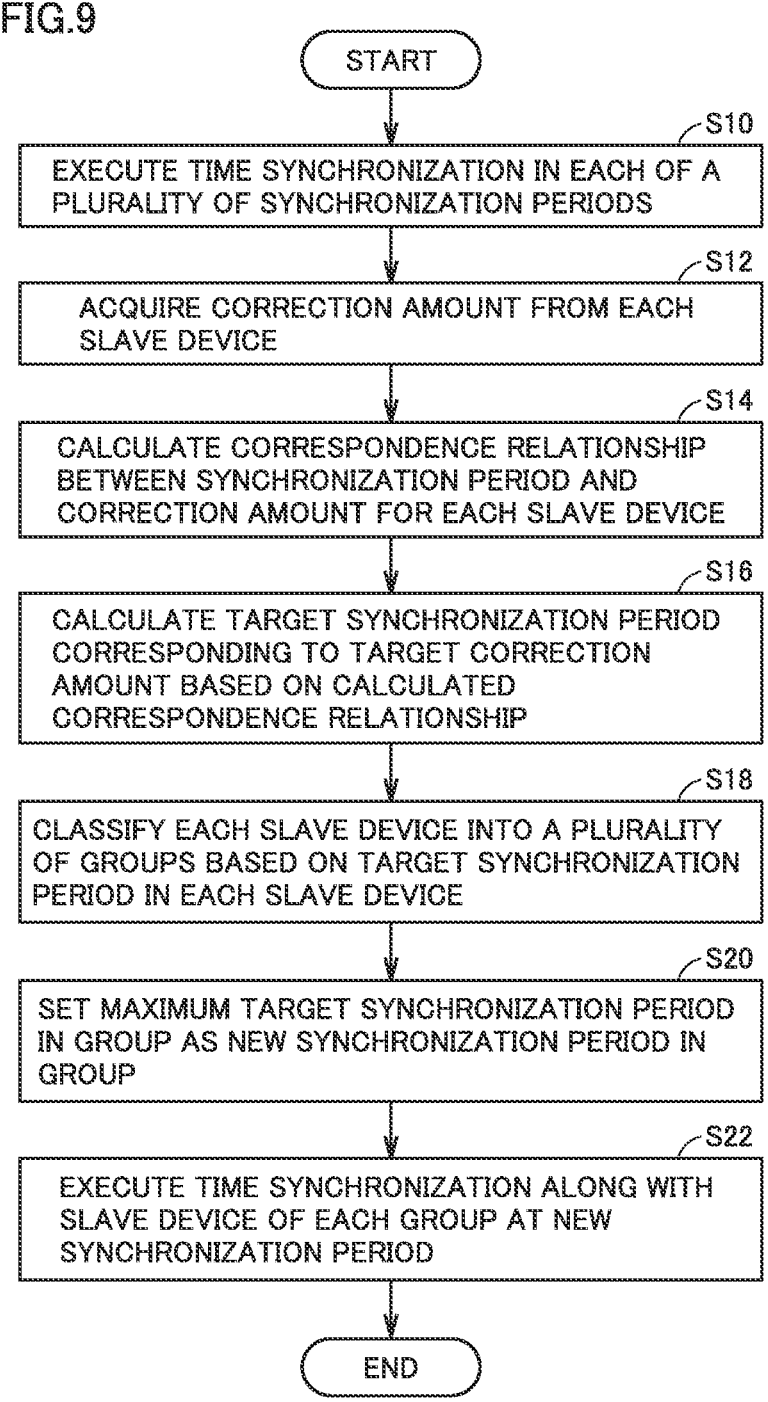
FIG. 9 is a flowchart illustrating an example of a processing procedure of the master device according to the first embodiment.

FIG. 9 is a flowchart illustrating an example of a processing procedure of master device 1 according to the first embodiment. CPU 11 of master device 1 executes the program stored in memory 12, thereby implementing each of the following steps.

Referring to FIG. 9, master device 1 executes the time synchronization along with slave device 2 in each of the plurality of synchronization periods (step S10). Master device 1 acquires each synchronization period and the correction amount in executing the time synchronization at each synchronization period from each slave device 2 (step S12).

Master device 1 calculates the correspondence relationship between the synchronization period and the correction amount for each slave device 2 (step S14). For example, master device 1 calculates linear functions L #1 to L #13 in each slave device 2.

Master device 1 calculates the target synchronization period (for example, X #1 to X #13) corresponding to target correction amount Ys based on the correspondence relationship of each slave device 2 (step S16). Master device 1 classifies each slave device 2 into the plurality of groups based on the target synchronization period in each slave device 2 (step S18).

For each group, master device 1 sets the maximum target synchronization period among the target synchronization periods of slave devices 2 classified into the group as the new synchronization period in which master device 1 executes the time synchronization along with slave device 2 (step S20). Master device 1 executes the time synchronization along with the plurality of slave devices 2 belonging to each group at the new synchronization period set for each group (step S22).

Figure 10:
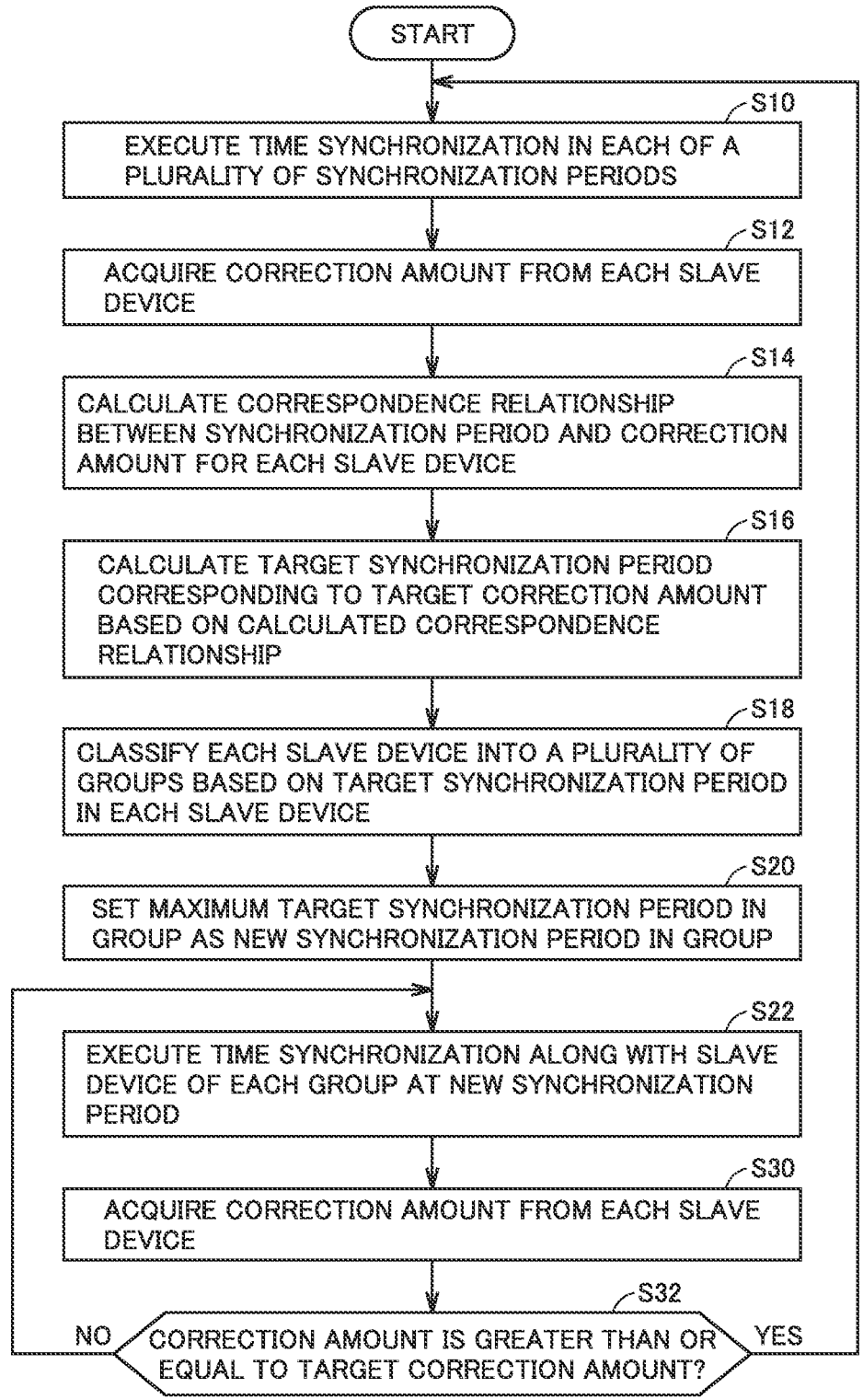
FIG. 10 is a flowchart illustrating another example of the processing procedure of the master device according to the first embodiment.

FIG. 10 is a flowchart illustrating another example of the processing procedure of master device 1 according to the first embodiment. Referring to FIG. 10, because the pieces of processing of steps S10 to S22 is similar to the processing in FIG. 9, the detailed description thereof will not be repeated.

Master device 1 acquires the correction amount in executing the time synchronization at the new synchronization period from each slave device 2 (step S30). Specifically, master device 1 acquires the correction amount associated with the new synchronization period.

Master device 1 determines whether at least one of the plurality of correction amounts acquired from the plurality of slave devices 2 is greater than or equal to target correction amount Ys (step S32). When the at least one of the correction amounts is greater than or equal to target correction amount Ys (YES in step S32), master device 1 executes the processing of step S10. Otherwise (NO in step S32), master device 1 executes the processing of step S22.

<Advantages>

According to the first embodiment, each slave device 2 is classified into the plurality of groups so that the time synchronization accuracy can be secured, and communication frequency of the PTP message transmitted and received between master device 1 and slave device 2 can be optimized for each group. As a result, the communication traffic of the PTP message can be reduced while the time synchronization accuracy is ensured, and the load on the network can be reduced. In addition, because it is not necessary to use an expensive and highly accurate clock transmitter in master device 1 and slave device 2, price of the device can be kept down.

Second Embodiment

The scheme of classifying each slave device 2 into the plurality of groups using the preset target correction amount is described in the first embodiment. In a second embodiment, a scheme of classifying each slave device 2 into the plurality of groups by the method different from the first embodiment will be described.

Figure 11:
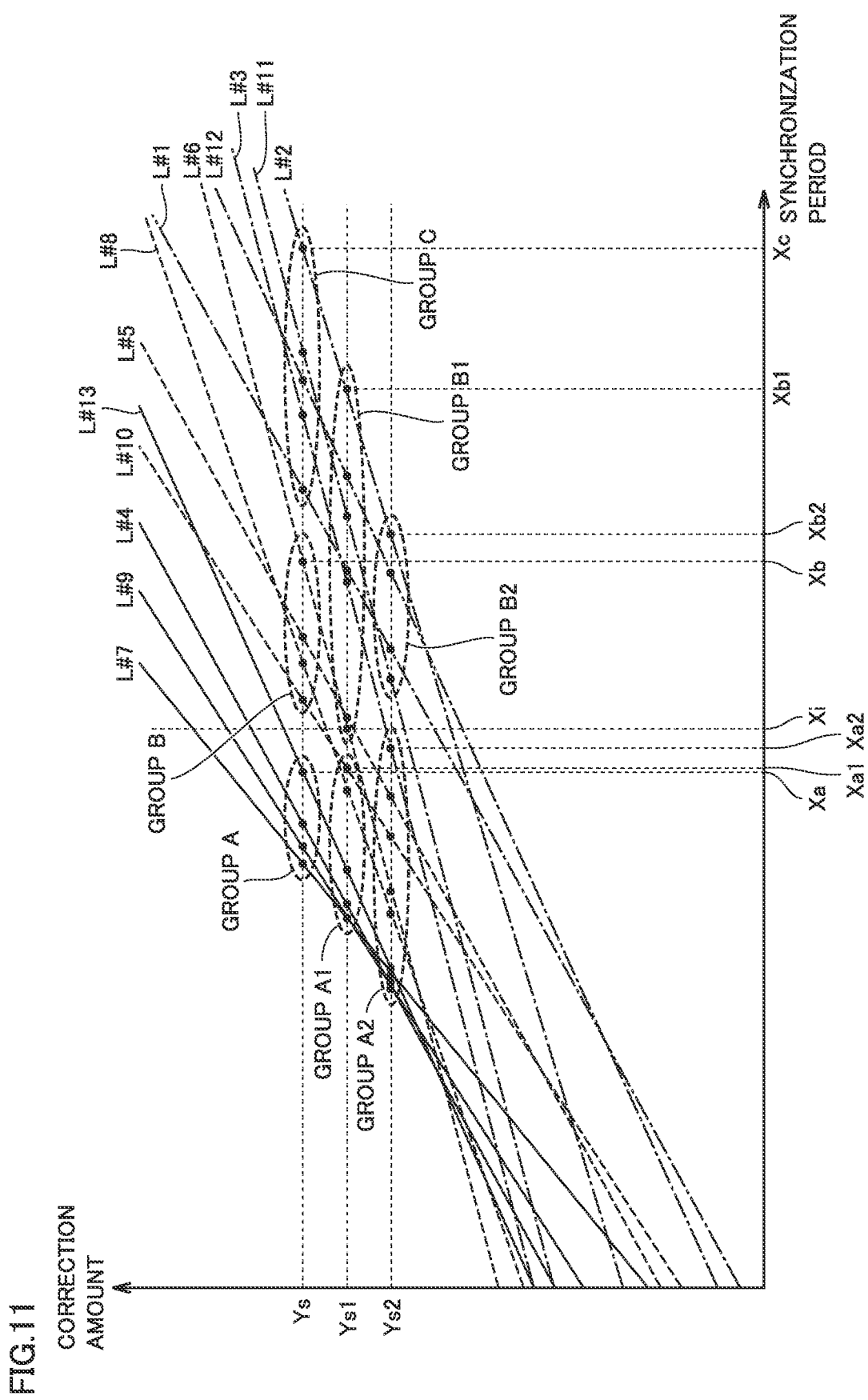
FIG. 11 is a diagram illustrating a classification scheme according to a second embodiment.

FIG. 11 is a diagram illustrating a classification scheme of the second embodiment. Referring to FIG. 11, first, similarly to the first embodiment, slaves #1 to #13 are classified into groups A to C using the k-means method. The classification scheme of classifying slaves #1 to #13 into groups A to C is defined as a classification scheme O1.

Then, it is assumed that target correction amount Ys is reduced to Ys1, that the number of groups and the number of slave devices 2 included in each group are changed, and that each of slaves #1 to #13 is classified into groups A1 and B1. Group A1 includes six slaves #4, #7 to #10, and #13, and group B1 includes seven slaves #1 to #3, #5, #6, #11, and #12. A classification scheme of classifying the slaves #1 to #13 into the groups A1 and B1 is defined as a classification scheme O2.

In addition, it is assumed that target correction amount Ys1 is further reduced to Ys2, that the number of slave devices 2 included in each group is changed, and that each of slaves #1 to #13 is classified into groups A2 and B2. Group A2 includes nine slaves #3 to #10 and #13, and group B2 includes four slaves #1, #2, #11 and #12. A classification scheme of classifying slaves #1 to #13 into groups A2 and B2 is defined as a classification scheme O3.

Master device 1 evaluates which classification scheme among classification schemes O1 to O3 is used to classify slaves #1 to #13 so as to reduce the network load as a whole when master device 1 and slaves #1 to #13 execute the time synchronization.

When the number of slave devices 2 included in the group is small, the number of times of transmitting the PTP message between the master device 1 and each slave device 2 in the group is reduced, and the network load on communication system 100 is reduced. In addition, when the synchronization period is large, an interval of transmitting and receiving the PTP message becomes long, and thus the network load becomes small. In consideration of these, an evaluation value E is defined as the following equation (3).

[Mathematical Formula 1]

$$E = \sum_{i=1}^{GN} (SN_i / X_i) \quad (3)$$

In equation (3), GN represents the number of groups, $SN_i$ represents the number of slave devices 2 included in a group i, and $X_i$ represents the maximum target synchronization period among the target synchronization periods of respective slave devices 2 included in group i. Target synchronization periods Xa1, Xa2 are target synchronization periods X #10 and X #3, respectively, and target synchronization periods Xb1, Xb2 are target synchronization periods X #2, X #2, respectively. Evaluation values E1 to E3 corresponding to classification schemes O1 to O3 are expressed by the following equations (4) to (6).

$$E1 = 4/Xa + 4/Xb + 5/Xc \quad (4)$$

$$E2 = 6/Xa1 + 7/Xb1 \quad (5)$$

$$E3 = 9/Xa2 + 4/Xb2 \quad (6)$$

The evaluation value E is an index indicating the network load on entire communication system 100 when the time synchronization is executed between master device 1 and each slave device 2 (that is, the PTP message is transmitted and received). That is, the smaller evaluation value E, the smaller the network load.

Master device 1 classifies slaves #1 to #13 into the plurality of groups according to the classification scheme corresponding to a minimum evaluation value among the evaluation values E1 to E3. For example, when evaluation value E2 is the minimum evaluation value, master device 1 classifies slaves #1 to #13 into groups A1 and B1 (that is, the classification is performed according to classification scheme O1). In this way, by classifying slave devices 2 into the plurality of groups, it is possible to implement grouping such that the target correction amount is small and the synchronization period is long.

In the above description, the case where there are three classification schemes is described, but the number of classification schemes may be two or four or more.

<Functional Configuration>

The functional configuration of master device 1 of the second embodiment is similar to the functional configuration in FIG. 8, but the function of classification unit 109 is different. In this case, the function of classification unit 109 of master device 1 according to the second embodiment will be described.

Classification unit 109 of the second embodiment classifies each slave device 2 into a first plurality of candidate groups based on the target synchronization period in each slave device 2. For example, classification unit 109 classifies slaves #1 to #13 into the first plurality of candidate groups (for example, groups A to C) based on target synchronization periods X #1 to X #13.

Classification unit 109 classifies each slave device 2 into a second plurality of candidate groups different from the first plurality of candidate groups. Specifically, classification unit 109 classifies each slave device 2 into the second plurality of candidate groups by executing at least one of a change in target correction amount Ys used in the classification into the first plurality of candidate groups and a change in the number of the first plurality of candidate groups.

At this point, it is assumed that the first plurality of candidate groups are groups A to C. In this case, for example, classification unit 109 classifies each of slaves #1 to #13 into the second plurality of candidate groups (for example, groups A1 and B1) by changing target correction amount Ys to Ys1 and changing the number of groups from 3 to 2.

Classification unit 109 may classify slaves #1 to #13 into the second plurality of candidate groups by changing target correction amount Ys to Ys1 without changing the number of groups (that is, the number of groups is three). For example, a classification scheme in which the first group includes six slaves #4, #7 to #10, and #13, the second group includes four slaves #1, #5, #6, and #13, and the third group includes three slaves #2, #11, and #12 is conceivable in this case.

Classification unit 109 may classify slaves #1 to #13 into the second plurality of candidate groups by changing the number of groups (for example, changing the number of groups from three to two) without changing target correction amount Ys. In this case, for example, it is conceivable that the first group includes four slaves #4, #7, #9, and #13, and the second group includes nine slaves #1 to #3, #5, #6, #8, and #10 to #12.

Furthermore, classification unit 109 may classify each slave device 2 into a new third plurality of candidate groups by exchanging slave device 2 belonging to the first candidate group among the second plurality of candidate groups for the slave device 2 belonging to the second candidate group among the second plurality of candidate groups. At this point, it is assumed that the second plurality of candidate groups are groups A1 and B1. For example, a classification scheme of classifying each of slaves #1 to #13 into a plurality of new candidate groups by exchanging slave #8 included in group A1 for slave #5 included in group B1 or by exchanging slave #10 included in group A1 for slave #6 included in group B1 can be considered in this case.

Classification unit 109 may classify each slave device 2 into the second plurality of candidate groups by exchanging the slave device 2 belonging to the first candidate group among the first plurality of candidate groups for the slave device 2 belonging to the second candidate group among the first plurality of candidate groups. At this point, it is assumed that the first plurality of candidate groups are groups A to C. For example, a classification scheme of classifying each of slaves #1 to #13 into a new plurality of candidate groups by exchanging slave #13 included in group A for slave #10 included in group B is conceivable in this case.

In this manner, classification unit 109 classifies each slave device 2 into the plurality of candidate groups by randomly executing the change of the target correction amount, the change of the number of groups, and the replacement of slave devices 2 between the groups.

Then, based on a predetermined equation (for example, equation (3)), classification unit 109 calculates a first evaluation value (for example, evaluation value E1) indicating the network load on communication system 100 in classifying each slave device 2 into the first plurality of candidate groups (for example, groups A to C) and a second evaluation value (for example, evaluation value E2) indicating the network load on communication system 100 classifying each slave device 2 into the second plurality of candidate groups (for example, groups A1 and B1). In other words, each of the first evaluation value and the second evaluation value is one index evaluating the network load.

Classification unit 109 determines the plurality of candidate groups corresponding to the minimum evaluation value of the first evaluation value and the second evaluation value as the plurality of groups classifying finally each slave device 2, and classifies each slave device 2 into the plurality of groups.

<Processing Procedure>

Figure 12:
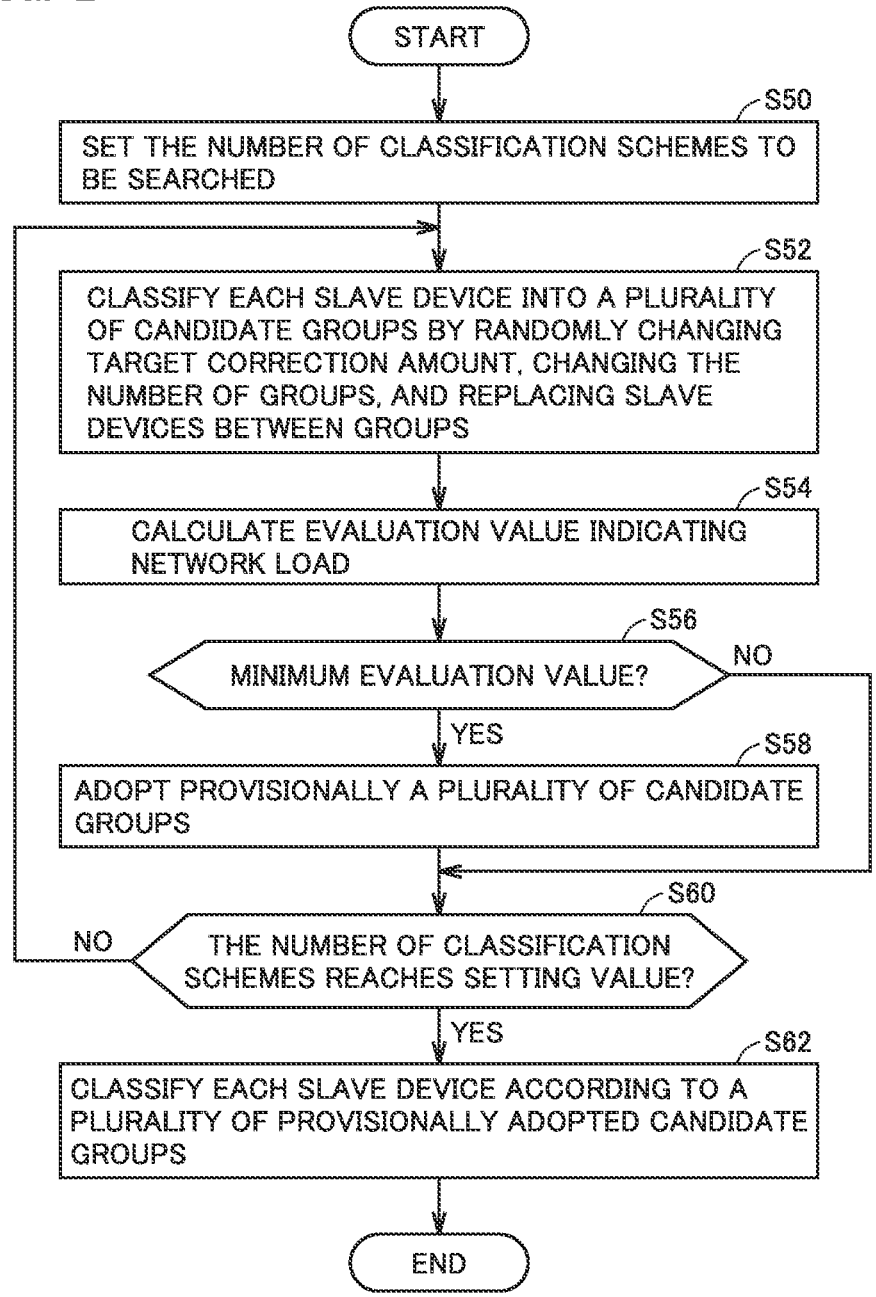
FIG. 12 is a flowchart illustrating an example of classification processing executed by a master device of the second embodiment.

FIG. 12 is a flowchart illustrating an example of classification processing executed by master device 1 of the second embodiment. The processing procedure of master device 1 of the second embodiment is different from the processing procedure of the first embodiment in classification processing in step S18 in FIG. 9 or 10. The following steps more specifically describe the classification processing in step S18 of the second embodiment.

Referring to FIG. 12, master device 1 sets the number of classification schemes to be searched (step S50). In this case, it is assumed that the number is set to a setting value F. Subsequently, master device 1 classifies each slave device 2 into the plurality of candidate groups by randomly changing the target correction amount, changing the number of groups, and replacing the slave devices 2 between the groups (step S52).

Master device 1 calculates the evaluation value indicating the network load on communication system 100 when each slave device 2 classified into the plurality of candidate groups in step S52 and master device 1 execute the time synchronization (step S54). Specifically, master device 1 calculates the evaluation value using equation (3).

Master device 1 determines whether the evaluation value calculated in step S54 is the minimum evaluation value as compared with the evaluation values corresponding to the plurality of candidate groups searched so far (step S56). When the evaluation value is not the minimum evaluation value (NO in step S56), master device 1 executes the processing of step S60. When the evaluation value is the minimum evaluation value (YES in step S56), master device 1 provisionally adopts the plurality of candidate groups in step S52 as grouping candidates (step S58).

Master device 1 determines whether the number of searched classification schemes reaches the setting value F (step S60). When the setting value F is not reached (NO in step S60), master device 1 executes the processing of step S52. When the setting value F is reached (YES in step S60), master device 1 classifies each slave device 2 according to the plurality of candidate groups provisionally adopted in step S58 (step S62). Specifically, master device 1 determines the plurality of provisionally adopted candidate groups as a final plurality of groups, and classifies each slave device 2 into the plurality of groups.

<Advantages>

According to the second embodiment, each slave device 2 is classified according to the classification scheme having the smallest network load among the plurality of classification schemes. As a result, in addition to the advantages of the first embodiment, the network load on communication system 100 can be more appropriately reduced.

Third Embodiment

In a third embodiment, a configuration in which master device 1 and each slave device 2 perform multi-hop communication will be described.

Figure 13:
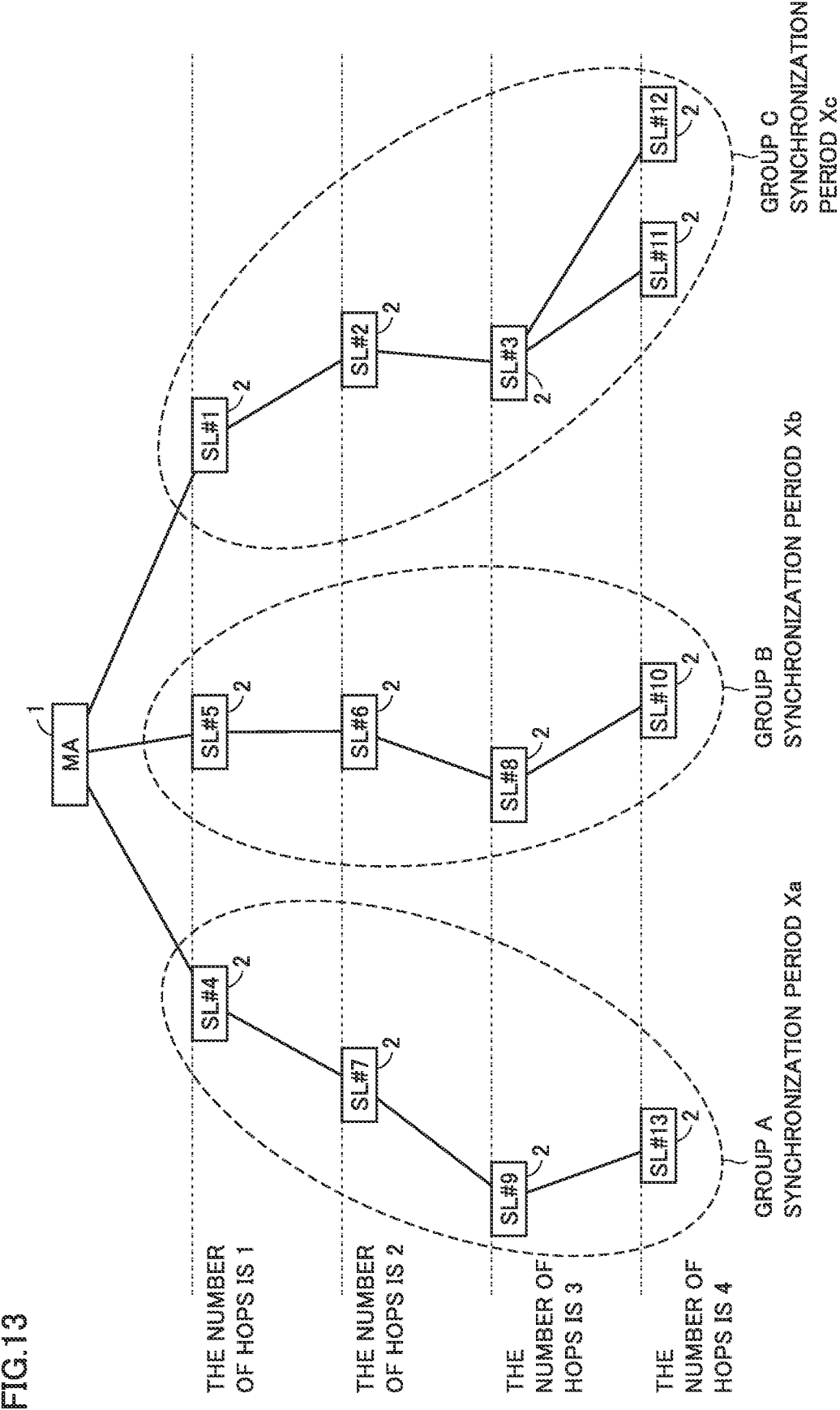
FIG. 13 is a diagram illustrating an example of a network configuration in a communication system according to a third embodiment.

FIG. 13 is a diagram illustrating an example of a network configuration in a communication system 100A according to a third embodiment. Communication system 100A in FIG. 13 illustrates a state in which each slave device 2 is classified into the plurality of groups according to the group classification scheme described in the first or second embodiment.

In the example of FIG. 13, it is assumed that each slave device 2 is classified into groups A to C.

Referring to FIG. 13, master device 1 and the plurality of slaves #1 to #13 correspond to the multi-hop communication in which a plurality of devices relay data by a bucket relay scheme to connect remote locations. Master device 1 and each of the slave devices #1 to #13 are configured to be communicable with a device existing in a communication range decided by wireless characteristics (for example, signal strength, reception sensitivity, directivity, and the like). An ad-hoc network that is an autonomous wireless network is formed by master device 1 and slaves #1 to #13. The ad-hoc network has a tree structure in which master device 1 is the highest node.

In the example of FIG. 13, the nodes corresponding to a first hop path from master device 1 are slaves #1, #4, #5, the nodes corresponding to a second hop path are slaves #2, #6, #7, the nodes corresponding to a third hop path are slaves #3, #8, #9, and the nodes corresponding to a fourth hop path are slaves #10 to #13. At this point, it is assumed that the number of hops of a node corresponding to a K-th path from master device 1 is "K".

When the network is constructed as illustrated in FIG. 13, master device 1 searches for slave device 2 communicable with master device 1, and stores search information indicating a search result. Each of slaves #1 to #13 searches for a device (for example, master device 1 and other slave devices 2) capable of communicating with the own device, stores the search information indicating the search result, and transmits the search information to master device 1 by multi-hop communication. Master device 1 calculates a plurality of communication paths between master device 1 and each of slaves #1 to #13 using the search information about master device 1 and the search information received from each of slaves #1 to #13.

For example, in group A, it is assumed that slave #4 is communicable with master device 1 and slave #7, and slave #7 is communicable with slaves #9 and #13. In this case, master device 1 calculates a communication path R1 of master device 1→slave #4→slave #7→slave #9→slave #13 and a communication path R2 of master device 1→slave #4→slave #7→slave #13 as communication paths between the own device and each of slaves #4, #7, #9, and #13 belonging to group A. Communication path R1 is a communication path in FIG. 13.

At this point, when the time synchronization is executed in the multi-hop wireless network, a propagation delay time varies due to a jitter generated in slave device 2 of a repeater, and thus the time synchronization accuracy deteriorates every time the repeater is used. Therefore, in order to ensure the time synchronization accuracy, it is preferable to minimize the number of hops of the plurality of slave devices 2 belonging to each group.

For example, it is assumed that communication paths R1, R2 are calculated as described above in group A. In the case of communication path R1, slave #13 of slaves #4, #7, #9, #13 belonging to group A has "4" that is the maximum hop count. On the other hand, in the case of communication path R2, slaves #9 and #13 have "3" that is the maximum hop count. Consequently, the number of hops of each slave device 2 is minimized in communication path R2 compare with communication path R1. Consequently, master device 1 changes the communication path in performing the multi-hop communication with each slave device 2 belonging to group A from communication path R1 to communication path R2.

Figure 14:
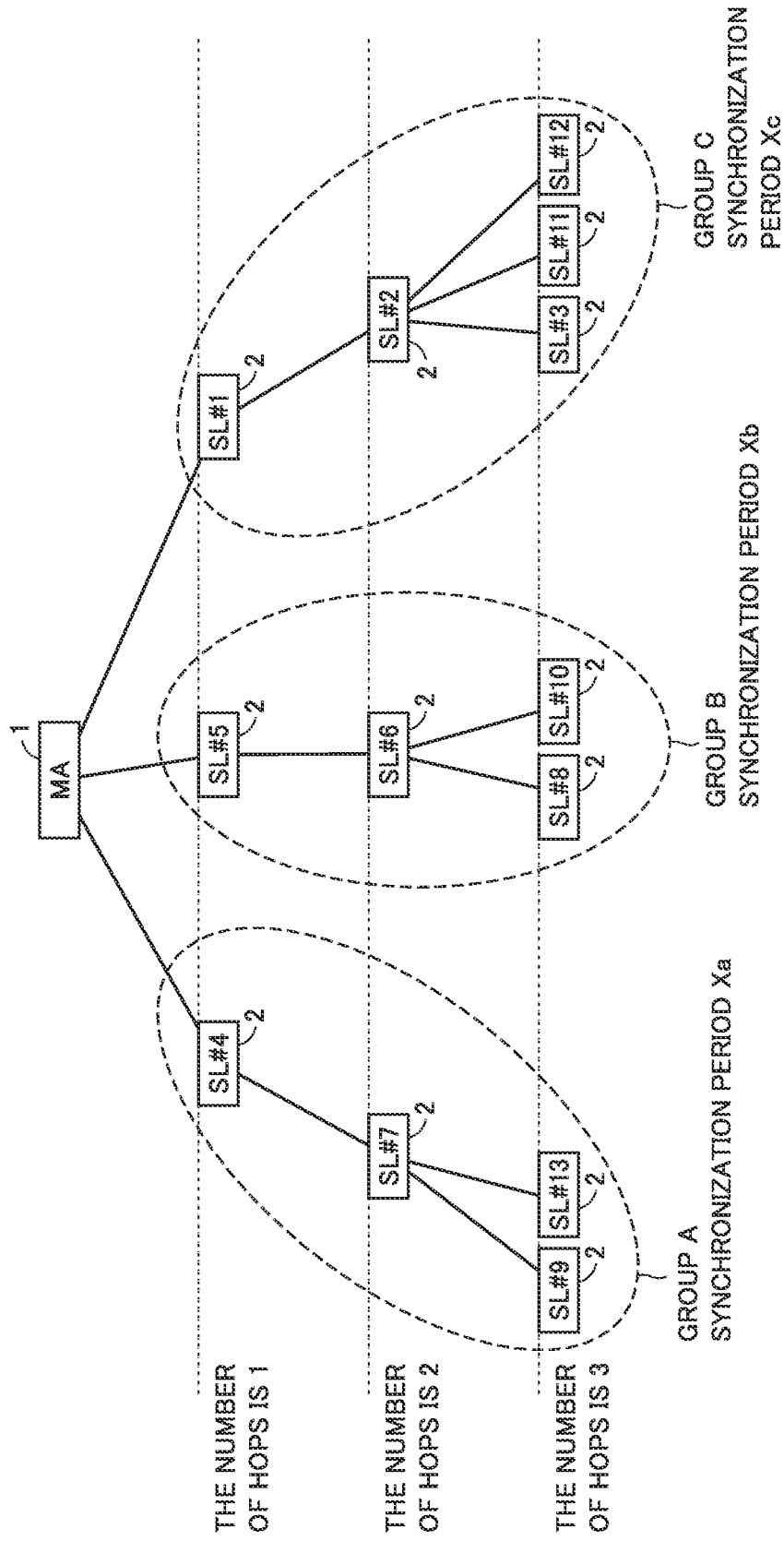
FIG. 14 is a diagram illustrating a network configuration after a change in the communication system of the third embodiment.

FIG. 14 is a diagram illustrating a network configuration after the change in communication system 100A of the third embodiment. As described above with reference to FIG. 14, the communication path between each slave belonging to group A and master device 1 is changed from communication path R1 in FIG. 13 to communication path R2. The communication path between each of slaves #5, #6, #8, #10 belonging to group B and master device 1 is also changed, and the maximum hop count decreases from "4" to "3". Similarly, the communication path between each of slaves #1 to #3, #11, #12 belonging to group C and master device 1 is also changed, and the maximum hop count decreases from "4" to "3".

For each of the plurality of groups, according to a communication path of the plurality of communication paths in the group that minimizes the number of hops of the plurality of slave devices 2 belonging to the group, master device 1 performs the multi-hop communication with the plurality of slave devices 2. Specifically, master device 1 executes the time synchronization along with each slave device 2 using the multi-hop communication.

<Functional Configuration>

Figure 15:
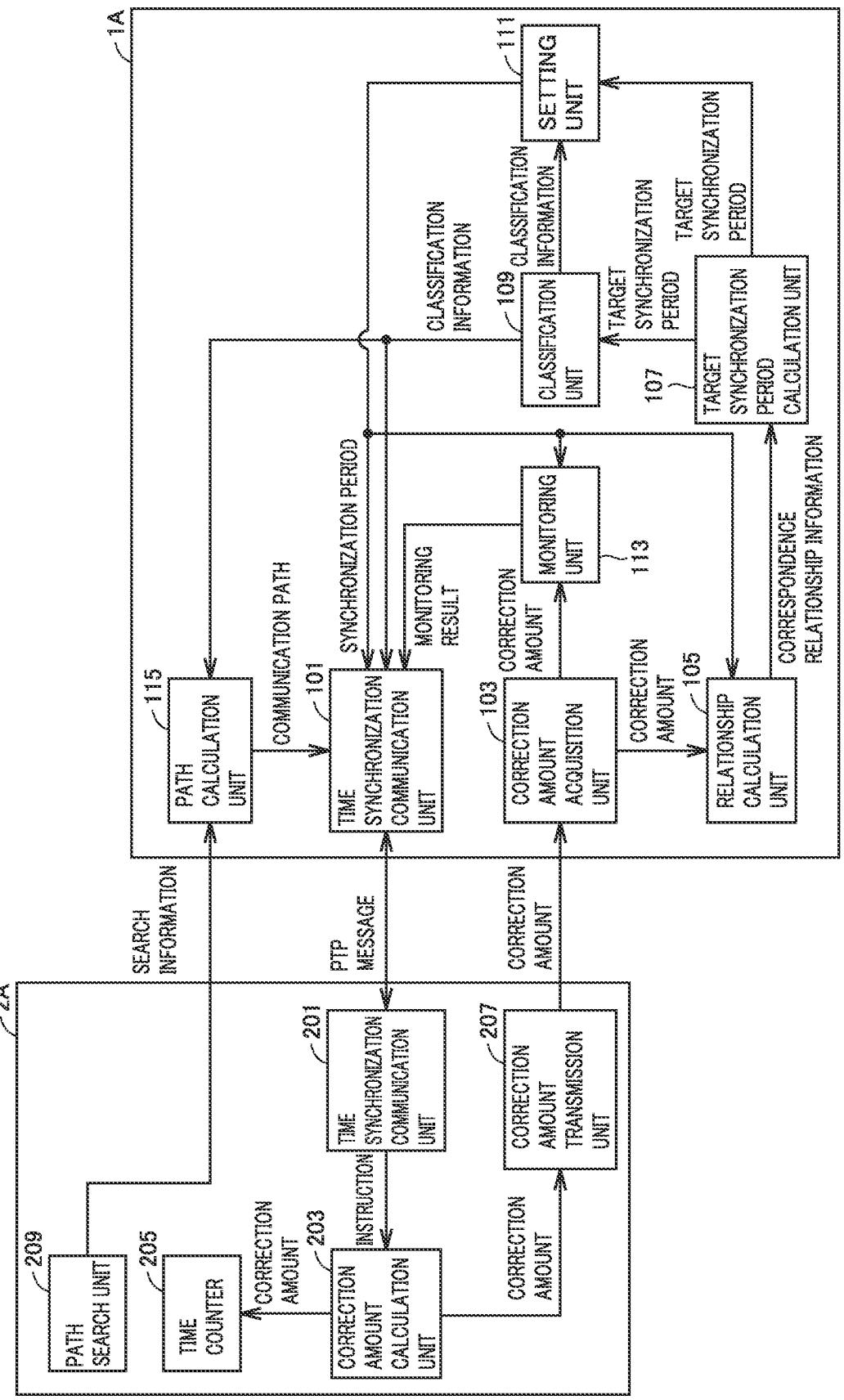
FIG. 15 is a block diagram illustrating a functional configuration of a master device of the third embodiment.

FIG. 15 is a block diagram illustrating a functional configuration of a master device 1A of the third embodiment. Referring to FIG. 15, the functional configuration of master device 1A corresponds to the configuration in which a path calculation unit 115 is added to the functional configuration in FIG. 8. A functional configuration of a slave device 2A corresponds to a configuration in which the path search unit 209 is added to the functional configuration in FIG. 8. For this reason, the configurations of path calculation unit 115 and path search unit 209 will be described. Although master device 1A corresponds to master device 1 in FIG. 1 and slave device 2A corresponds to slave device 2 in FIG. 1, an additional reference numeral such as "A" is given for convenience for the purpose of distinguishment from the functional configuration in FIG. 8. The same applies to the following embodiments.

Path search unit 209 searches for a device (for example, master device 1 and other slave devices 2) capable of communicating with slave device 2A, stores the search information indicating the search result, and transmits the search information to master device 1 by the multi-hop communication.

Path calculation unit 115 calculates a plurality of communication paths between the master device and the plurality of slave devices belonging to the group for each of the plurality of groups base on the search information received from path search unit 209 of each slave device 2, the search information of master device 1, and the classification information from the classification unit 109.

Subsequently, for each of the plurality of groups, path calculation unit 115 extracts the communication path of the plurality of communication paths in the group that minimizes the number of hops of the plurality of slave devices 2 belonging to the group. For example, path calculation unit 115 extracts the communication path that minimizes the maximum value of the number of hops of slaves #4, #7, #9, #13 belonging to group A among the plurality of communication paths in group A.

Time synchronization communication unit 101 executes the time synchronization by executing the multi-hop communication with the plurality of slave devices 2 belonging to the group according to the communication path extracted for each of the plurality of groups.

<Processing Procedure>

Figure 16:
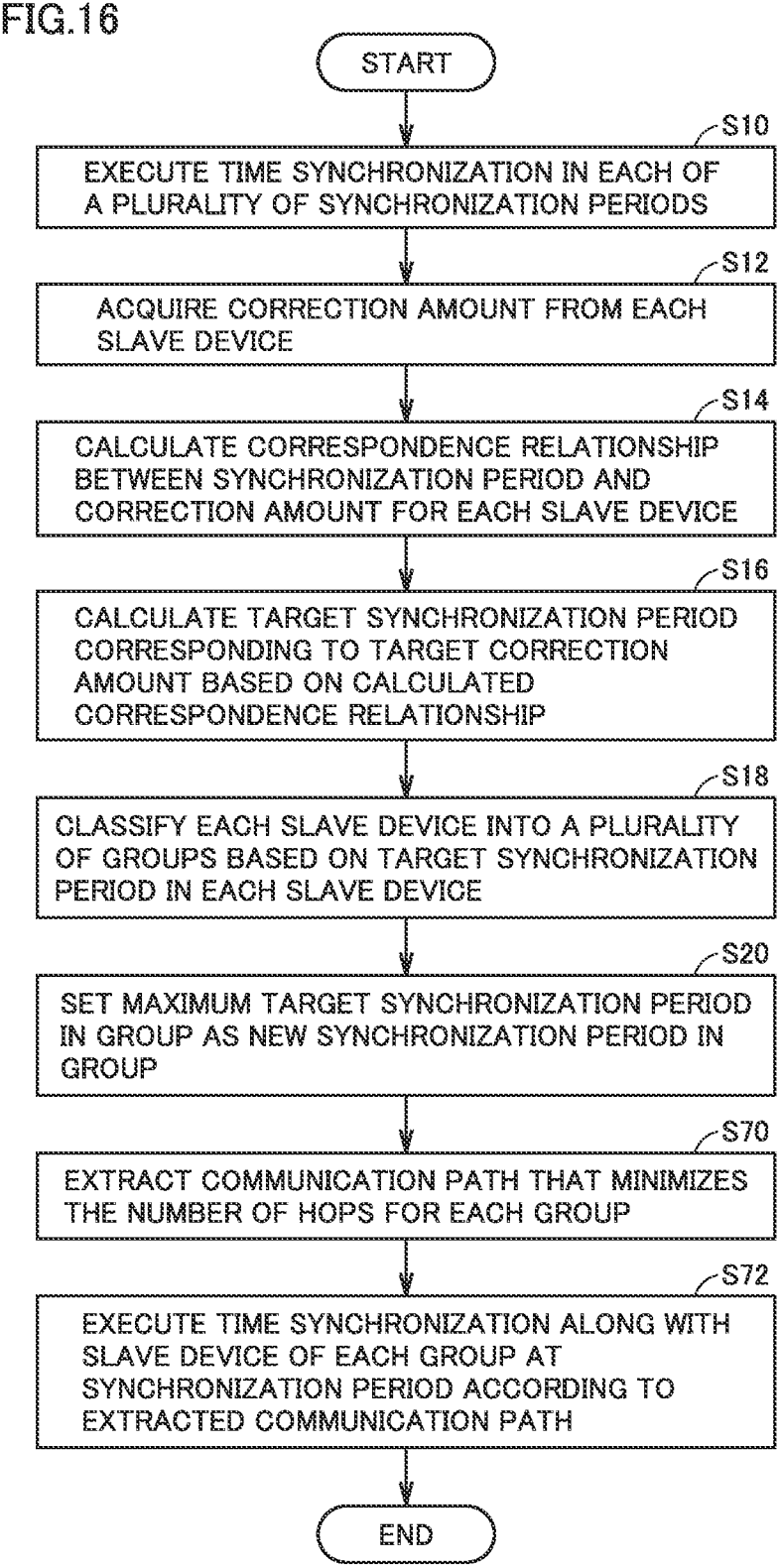
FIG. 16 is a flowchart illustrating an example of a processing procedure of the master device according to the third embodiment.

FIG. 16 is a flowchart illustrating an example of a processing procedure of master device 1A according to the third exemplary embodiment.

Referring to FIG. 16, each processing of steps S10 to S20 is similar to the processing in FIG. 9, and thus the detailed description thereof will not be repeated. For each of the plurality of groups, master device 1A extracts the communication path of the plurality of communication paths between master device 1A and the plurality of slave devices 2 belonging to the group that minimizes the number of hops of the plurality of slave devices 2 (step S70). Master device 1A executes the time synchronization by executing the multi-hop communication with the plurality of slave devices 2 belonging to the group according to the communication path extracted for each of the plurality of groups (step S72).

The flowchart in FIG. 16 is obtained by replacing step S22 of the flowchart in FIG. 9 with steps S70 and S72. Master device 1A may execute processing in which step S22 of the flowchart n FIG. 10 is replaced with steps S70 and S72.

<Advantages>

According to the third embodiment, because master device 1 and each slave device 2 execute the multi-hop communication according to the communication path having the minimum number of hops, the required time synchronization accuracy can be secured.

Figure 17:
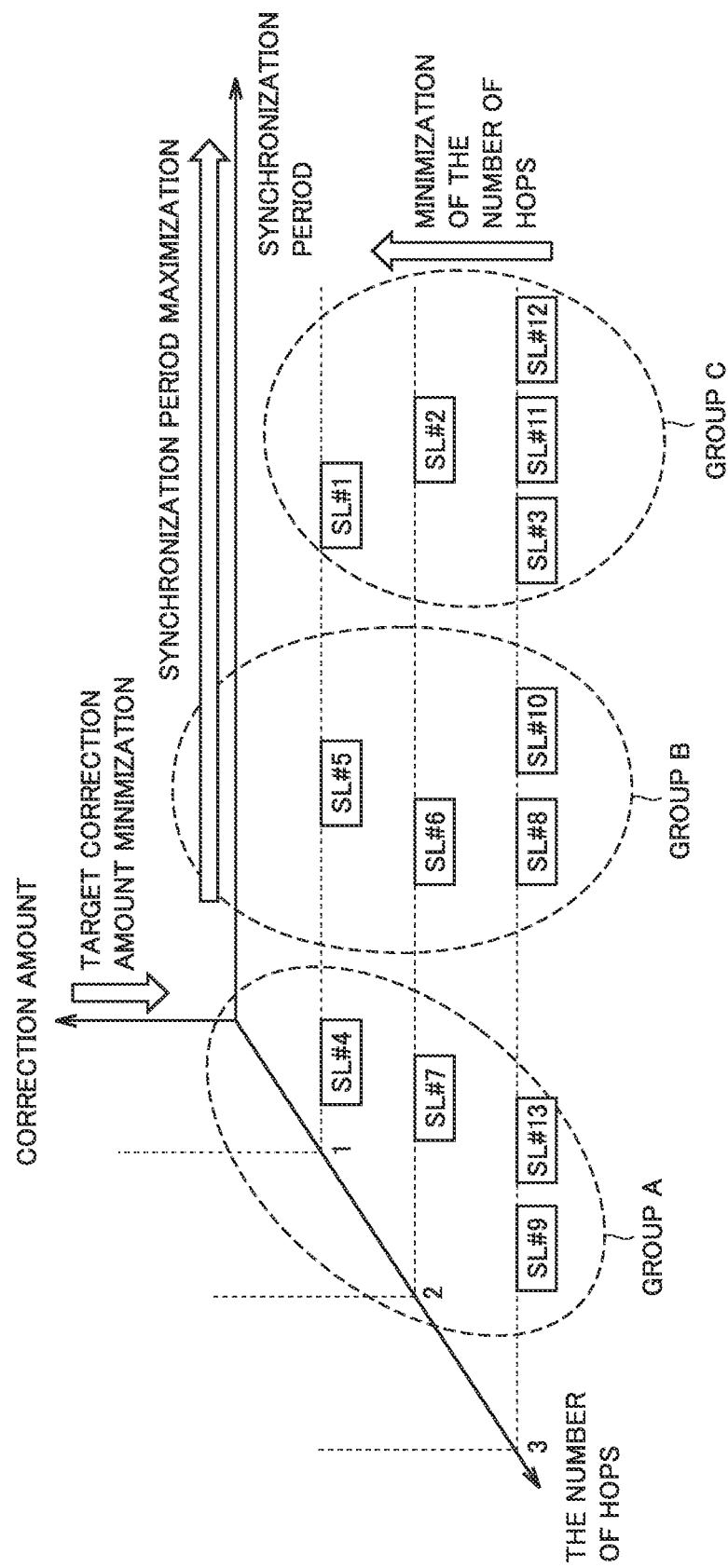
FIG. 17 is a conceptual diagram illustrating other advantages of the third embodiment.

In the third embodiment, each slave device 2 may be classified into the plurality of groups by adopting the classification scheme according to the second embodiment. FIG. 17 is a conceptual diagram illustrating other advantages of the third embodiment. Referring to FIG. 17, each slave device 2 is classified into the plurality of groups such that the target correction amount is small and the synchronization period is long according to the classification scheme of the second embodiment. Furthermore, according to the third embodiment, master device 1 and each slave device 2 can execute the multi-hop communication according to the communication path having the minimum number of hops. As a result, even when the multi-hop communication is executed, it is possible to reduce the load on the network while the accuracy of time synchronization is secured.

Fourth Embodiment

In the above embodiment, the configuration in which each slave device 2 is classified into the plurality of groups using the grouping algorithm such as the k-means method has been described. In a fourth embodiment, a configuration for performing the group classification using machine learning will be described. For example, a master device of the fourth embodiment is configured to perform reinforcement learning. The reinforcement learning is a method in which, when an action is given in a certain state, a change due to update of the learning model converges (that is, when the learning is completed) in a process of repeatedly learning the learning model so as to select an action that maximizes a reward to be obtained in the future as an action to be performed next, and a learned model that selects an optimal action in a certain state is acquired.

Figure 18:
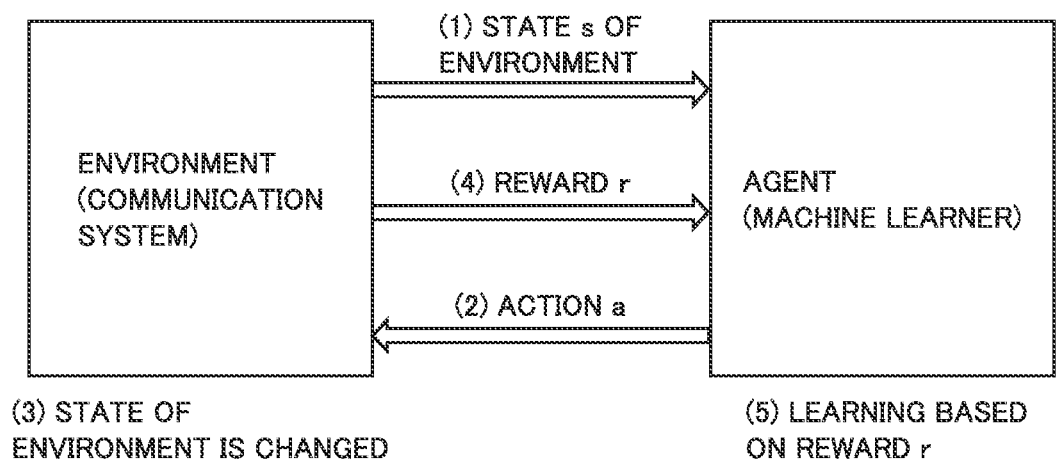
FIG. 18 is a diagram illustrating a basic concept of a reinforcement learning algorithm.

FIG. 18 is a diagram illustrating a basic concept of the reinforcement learning algorithm. Referring to FIG. 18, a framework of the reinforcement learning includes an agent, an environment, and an interaction therebetween. The agent is a subject that determines an action, and a machine learner in the master device corresponds to the agent in the fourth embodiment. The environment is a target with which the agent interacts, and the communication system to be controlled corresponds to the environment in the fourth embodiment.

Specifically, (1) the agent observes a state $s_t$ of the environment at a certain time point. (2) An action $a_t$ is selected based on an observation result and the past learning, and action $a_t$ is executed. (3) The execution of the action $a_t$ changes the state $s_t$ of the environment to a next state $s_{t+1}$. (4) A reward $r_{t+1}$ is given to the agent based on the change in the state. (5) The agent advances the learning based on state $s_t$, action $a_t$, reward $r_{t+1}$, and the result learned in the past, and converges the learning so as to obtain an optimal measure.

Figure 19:
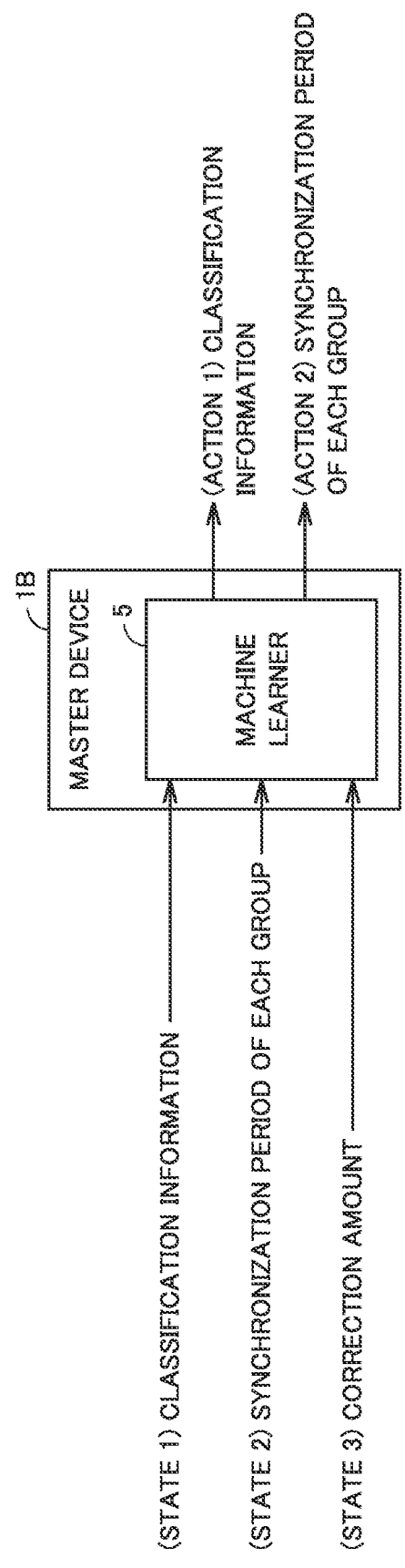
FIG. 19 is a diagram illustrating an input parameter and an output parameter of a machine learner of the master device according to a fourth embodiment.

FIG. 19 is a diagram illustrating an input parameter and an output parameter of a machine learner 5 of a master device 1B according to the fourth embodiment.

Referring to FIG. 19, the input parameters of machine learner 5 are state variables. The state variable includes the classification information, the synchronization period (hereinafter, also referred to as "the synchronization period of each group") when the time synchronization is executed along with at least one slave device 2 belonging to each group, and the correction amount acquired from each slave device 2. For example, the synchronization period of each group is synchronization periods Xa to Xc. The classification information includes the number of groups, the number of slave devices in each group, and the device number of the slave device belonging to each group.

The output parameter of machine learner 5 is an action value. The action value includes the classification information that maximizes the reward to be obtained in the future and the synchronization period of each group.

FIG. 20 is a diagram illustrating a reward criterion of the fourth embodiment. Machine learner 5 calculates the reward based on at least one of a reward criterion J1 and a reward criterion J2. First, the case where machine learner 5 calculates the reward based on reward criterion J1 will be described. In this case, machine learner 5 reduces the reward when a sum H of the synchronization periods in which each slave device 2 and master device 1B execute the time synchronization is greater than or equal to a sum Hs of a target synchronization period threshold of each slave device 2, and increases the reward when sum H of the synchronization periods is less than sum Hs of the target synchronization period threshold.

For example, it is assumed that slaves #1 to #13 are classified into groups A to C, the number of slave devices in group A is 4, the number of slave devices in group B is 4, and the number of slave devices in group C is 5. In addition, it is assumed that the synchronization periods of the groups A to C are Xa to Xc, respectively. In this case, sum H=4Xa+4Xb+5Xc. The target synchronization period threshold of each slave device 2 may be set to the same value, or a different value for each group.

Then, the case where machine learner 5 calculates the reward based on reward criterion J2 will be described. In this case, machine learner 5 compares the target range of the correction amount of the time synchronization with the correction amount acquired from each slave device 2 to increase or decrease the reward. An upper limit of the target range is also referred to as "a target range upper limit Du", and a lower limit value of the target range is also referred to as "a target range lower limit Dd". Target range upper limit Du is set to a value smaller than target correction amount Ys.

Machine learner 5 reduces the reward when at least one of the correction amounts acquired from each slave device 2 is larger than target range upper limit Du or smaller than target range lower limit Dd (that is, when it is out of the target range). Machine learner 5 increases the reward when all the correction amounts acquired from each slave device 2 are equal to or smaller than target range upper limit Du and equal to or larger than target range lower limit Dd (that is, when it is within the target range).

Machine learner 5 may be configured to calculate the reward using a reward criterion other than reward criterion J1 and reward criterion J2.

FIG. 21 is a diagram illustrating a process in which the network load is reduced by learning of machine learner 5. Specifically, FIG. 21 illustrates a process in which the network load is reduced when machine learner 5 increases or decreases the reward according to reward criterion J1.

Referring to FIG. 21, the synchronization period of each slave device 2 selected by machine learner 5 is large between times t1x to t2x, and as a result, sum H of the synchronization periods is large. In this case, although the network load in transmitting and receiving the PTP message is small, the required time synchronization accuracy cannot be secured.

In addition, from time t3x to time t4x, the synchronization period of each slave device 2 selected by machine learner 5 is considerably small, and as a result, sum H of the synchronization periods is also small. In this case, although the time synchronization accuracy can be secured, the network load in transmitting and receiving the PTP message increases.

From time t5x to time t6x at which the learning of the machine learner 5 has progressed, the synchronization period selected by machine learner 5 is optimized, and sum H of the synchronization periods converges to sum Hs of the target synchronization period threshold. In this case, the network load in transmitting and receiving the PTP message can be reduced while the time synchronization accuracy is secured. That is, the network load is optimized.

FIG. 22 is a diagram illustrating a process in which the correction amount of the time synchronization converges to the target range by the learning of machine learner 5. Specifically, FIG. 22 illustrates a process in which the correction amount acquired from a certain slave device 2 converges to the target range when machine learner 5 increases or decreases the reward according to reward criterion J2.

Referring to FIG. 22, because the synchronization period of slave device 2 selected by machine learner 5 is large between times t1a to t2a, the time synchronization accuracy decreases and the correction amount of the time synchronization increases. In this case, although the network load in transmitting and receiving the PTP message is small, the time synchronization accuracy cannot be secured.

In addition, from time t2a to time t3a, because the synchronization period selected by machine learner 5 is considerably small, the time synchronization accuracy becomes excessively high, and the correction amount of the time synchronization is small. In this case, although the time synchronization accuracy can be secured, the network load in transmitting and receiving the PTP message increases.

At time t4a to time t5a in which the learning of machine learner 5 has progressed, the synchronization period selected by machine learner 5 is optimized, and the correction amount converges to the target range. In this case, the network load in transmitting and receiving the PTP message can be reduced while the time synchronization accuracy is secured. That is, the network load is optimized.

<Functional Configuration>

Figure 23:
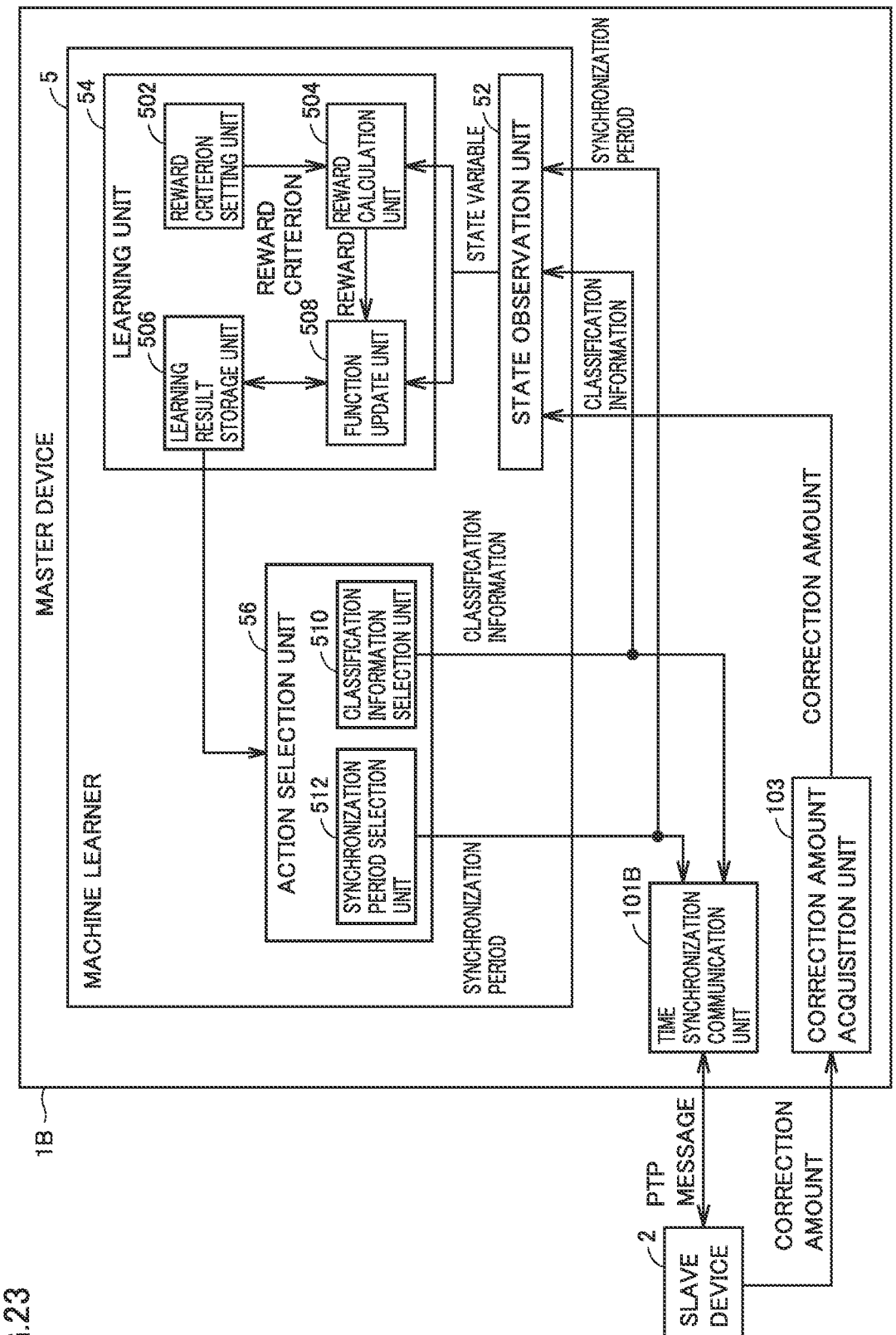
FIG. 23 is a schematic diagram illustrating a functional configuration of the master device of the fourth embodiment.

FIG. 23 is a schematic diagram illustrating a functional configuration of master device 1B of the fourth embodiment. Referring to FIG. 23, master device 1B includes a time synchronization communication unit 101B, correction amount acquisition unit 103, and machine learner 5 as main functional configurations. Machine learner 5 includes a state observation unit 52, a learning unit 54, and an action selection unit 56.

State observation unit 52 observes, as a state variable, each correction amount acquired from each slave device 2 by correction amount acquisition unit 103, and the synchronization period and the classification information of each group selected by action selection unit 56.

Learning unit 54 learns the synchronization period and the classification information of each group in order to optimize the network load according to a learning data set produced based on each correction amount, the synchronization period of each group, and the state variable including the classification information.

Any learning algorithm may be used as the learning algorithm used by learning unit 54. As an example, the case where the reinforcement learning is applied will be described. In the reinforcement learning, the agent in a certain environment observes the current state and determines the action to be taken. The agent obtains the reward from the environment by selecting the action, and learns the measure that maximizes the reward through a series of actions. Q-learning and TD-learning are known as representative techniques of the reinforcement learning. For example, in the case of the Q-learning, a general update equation (that is, an action value table) of an action value function Q(s,a) is expressed by the following equation (7).

[Mathematical Formula 2]

$$Q(s_t, a_t) \leftarrow Q(s_t, a_t) + \alpha \left( r_{t+1} + \gamma \max_a Q(s_{t+1}, a) - Q(s_t, a_t) \right) \quad (7)$$

In equation (7), t represents the environment at time t, and $a_t$ represents the action at time t. The action $a_t$ changes the environment to $s_{t+1}$. $r_{t+1}$ represents the reward given by the change in the environment, γ represents a discount rate, and α represents a learning coefficient. γ is in a range of $0<\gamma\leq1$, and α is in a range of $0<\alpha\leq1$. When the Q learning is applied, the output parameter of machine learner 5 is action $a_t$.

The update equation represented by equation (7) increases the action value when the action value of best action a at time t+1 is larger than the action value of action a executed at time t, and decreases the action value in the opposite case. In other words, action value function Q(s,a) is updated so that the action value of action a at time t approaches the best action value at time t+1. As a result, the best action value in a certain environment is sequentially propagated to the action value in the previous environment.

Learning unit 54 includes a reward criterion setting unit 502, a reward calculation unit 504, a learning result storage unit 506, and a function update unit 508.

Reward criterion setting unit 502 sets the reward criterion that defines how to increase or decrease the reward used for the learning of the learning model. For example, reward criterion setting unit 502 sets at least one of reward criterion J1 and reward criterion J2. In this case, reward criterion setting unit 502 sets sum Hs of the target synchronization period threshold, target range upper limit Du, target range lower limit Dd, and the like.

Reward calculation unit 504 calculates the reward based on the reward criterion set by reward criterion setting unit 502 and the state variable observed by state observation unit 52. In the case where reward criterion J1 is set, reward calculation unit 504 calculates sum H by adding the synchronization period of each group selected by action selection unit 56, reduces the reward (for example, the reward of "−1" is given) when sum H is greater than or equal to sum Hs of the target synchronization period threshold, and increases the reward (for example, the reward of "+1" is given) when sum H is less than sum Hs.

In the case where reward criterion J2 is set, reward calculation unit 504 reduces the reward in a case where at least one of the respective correction amounts acquired by the correction amount acquisition unit 103 is outside the target range, and increases the reward in a case where the respective correction amounts are within the target range. In a case where both reward criterion J1 and reward criterion J2 are set, reward calculation unit 504 increases the reward when the condition that sum H is less than sum Hs and each correction amount is within the target range is satisfied, and decreases the reward when the condition is not satisfied.

Learning result storage unit 506 stores the learning model that changes due to the update associated with the learning. Specifically, learning result storage unit 506 stores the action value table (that is, the Q table). In the initial state, the reward in the action value table is 0.

Function update unit 508 updates the function in order to determine the output parameter of machine learner 5 according to the reward calculated by reward calculation unit 504. Function update unit 508 updates the function by updating the action value table stored in learning result storage unit 506. The action value table is a data set in which an arbitrary action and the action value of the action are stored which associated with each other in a form of a table. For example, in the case of the Q-learning, action value function $Q(s_t, a_t)$ represented by equation (7) is used as a function obtaining the output parameter.

Action selection unit 56 selects the synchronization period and the classification information of each group based on action value function Q(s,a) which is the learning result of the learning unit 54 stored in the learning result storage unit 506. Typically, in the initial state, action selection unit 56 randomly selects the classification information and the synchronization period of each group. In the middle of the learning, action selection unit 56 selects the classification information and the synchronization period of each group using, for example, an ε-greedy method. The ε-greedy method is a method for randomly selecting one of actions that can be taken from a certain environment with a certain probability ε, and selecting the action having a maximum Q value from the environment that is the probability of (1−ε). Other known action selection schemes may be adopted.

The synchronization period and the classification information of each group selected by action selection unit 56 become the output parameters of machine learner 5. Action selection unit 56 includes a classification information selection unit 510 that selects next classification information and a synchronization period selection unit 512 that selects the synchronization period of each following group.

Each slave device 2 is classified into the plurality of groups based on the classification information selected by classification information selection unit 510. The classification information is input to state observation unit 52. The synchronization period of each group selected by synchronization period selection unit 512 is a synchronization period set for the group. The synchronization period of each group is input to state observation unit 52.

When the action value table is no longer updated and action value function Q $(s_t, at)$ converges, function update unit 508 determines that the learning by machine learner 5 ends. In this case, action selection unit 56 selects the classification information and the synchronization period of each group from which the most reward can be obtained based on converged action value function $Q(s_t, a_t)$.

Time synchronization communication unit 101B acquires the synchronization period and the classification information of each group selected by action selection unit 56. For each of the plurality of groups based on the classification information, time synchronization communication unit 101 executes the time synchronization along with at least one slave device 2 classified into the group at the synchronization period set to the group.

Correction amount acquisition unit 103 acquires the correction amount of the difference between the time of master device 1B and the time of slave device 2, the correction amount being transmitted from each slave device 2 when the time synchronization is executed. Correction amount acquisition unit 103 outputs each correction amount to machine learner 5 (specifically, state observation unit 52).

Machine learner 5 selects the classification information for classifying each slave device 2 into a plurality of other groups and selects for each of the plurality of other groups the new synchronization period in which at least one slave device 2 classified into the group and master device 1B execute the time synchronization, using the learning model (for example, action value function $Q(s_t, a_t)$), to which the classification information and the synchronization period of each group selected in inputting the previous state variable and each correction amount acquired by correction amount acquisition unit 103 are input.

<Processing Procedure>

Figure 24:
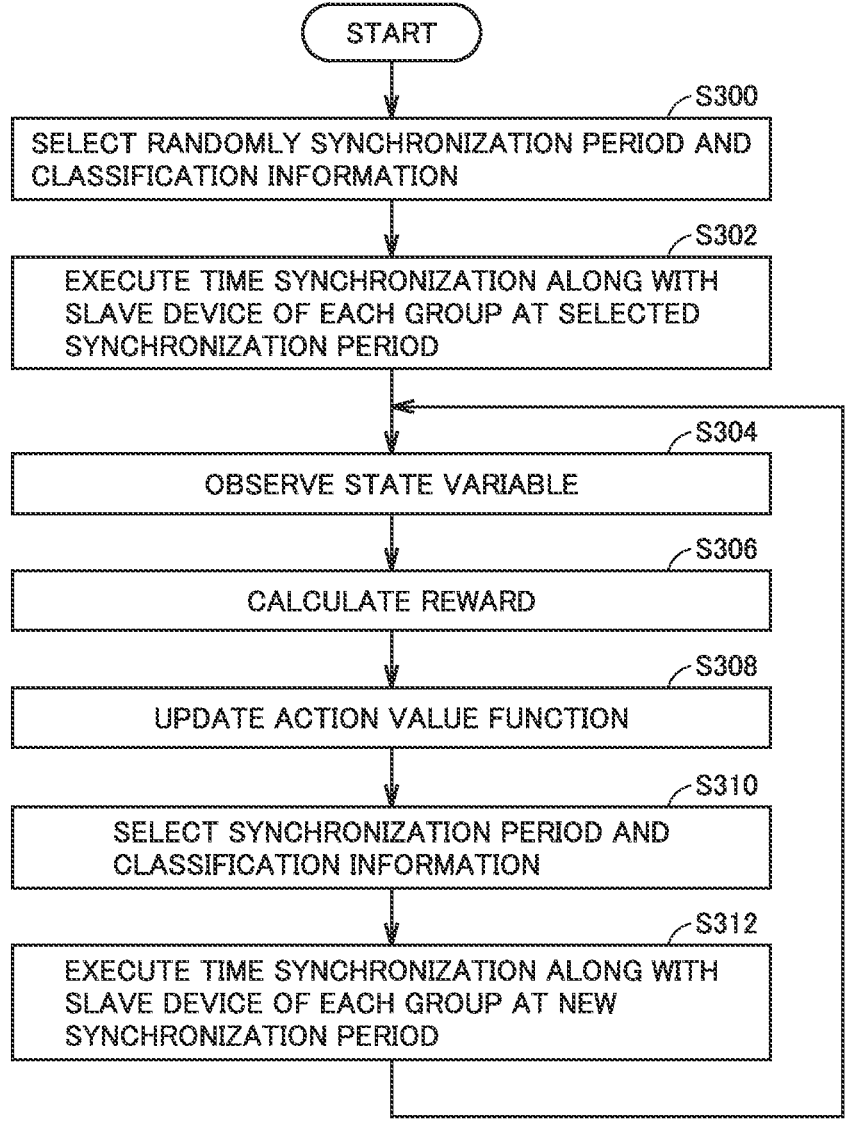
FIG. 24 is a flowchart illustrating an example of the processing procedure of the master device of the fourth embodiment.

FIG. 24 is a flowchart illustrating an example of the processing procedure of master device 1B according to the fourth embodiment. Referring to FIG. 24, master device 1B randomly selects the classification information and the synchronization period of each group, and classifies each slave device 2 into the plurality of groups based on the selected classification information (step S300). Specifically, master device 1B randomly sets the classification information and the initial value of the synchronization period of each group. At this point, the classification information and the synchronization period selected in step S300 are also referred to as "first classification information" and "a first synchronization period", respectively. Master device 1B executes the time synchronization along with at least one slave device 2 belonging to each group at the first synchronization period set to each group (step S302).

Master device 1B acquires the correction amount (hereinafter, also referred to as "a first correction amount") in executing the time synchronization in the first synchronization period from each slave device 2, and observes each acquired first correction amount, the first classification information set in step S302, and the first synchronization period of each group as the state variable (step S304).

Master device 1B calculates the reward according to the reward criterion described above (step S306). Master device 1B updates action value function $Q(s_t, a_t)$ using equation (7) (step S308). Master device 1B selects the classification information and the synchronization period of each group by using, for example, the ε-greedy method (step S310).

Master device 1B classifies each slave device 2 into the plurality of groups based on the selected classification information, and executes the time synchronization along with at least one slave device 2 belonging to each group at the synchronization period set to each group (step S312). Subsequently, master device 1B repeatedly executes the processing from step S304. As a result, action value function $(s_t, a_t)$ is updated, and the learning proceeds. Master device 1B may repeat the above processing in accordance with the synchronization period, but in this case, the processing load on master device 1B increases, and thus the above processing may be repeated for each of the plurality of synchronization periods.

Subsequently, when the update is no longer performed in step S308 and action value function $Q(s_t, a_t)$ is determined to converge, master device 1B ends the learning performed by machine learner 5. In this case, master device 1B selects the classification information and the synchronization period of each group with which the most reward is obtained based on converged action value function $Q(s_t, a_t)$. At this point, the classification information and the synchronization period selected in step S310 are also referred to as "second classification information" and "a second synchronization period", respectively. Then, master device 1B executes the time synchronization along with each slave device 2 based on the second classification information and the second synchronization period of each group. Through the series of processing in FIG. 24, the network load is optimized while the time synchronization accuracy is ensured as described with reference to FIGS. 21 and 22.

<Modification>

In this case, a scene in which converged action value function $(s_t, a_t)$ is utilized will be described. For example, it is assumed that the plurality of slave devices 2 includes slaves #1 to #13, and that action value function $Q(s_t, a_t)$ converges as a result in which master device 1B proceeds the processing in FIG. 24. Converged action value function $Q(s_t, a_t)$ corresponds to the learned model in which the change due to the update of the learning model converges to complete the learning.

Master device 1B selects the classification information (hereinafter, also referred to as "third classification information") classifying slaves #1 to #13 into the plurality of groups and the new synchronization period (hereinafter, also referred to as "a third synchronization period") in which at least one slave device classified into the group and master device 1B execute the time synchronization for each of the plurality of groups based on converged action value function $Q(s_t, a_t)$. That is, master device 1 selects the third classification information with which the most reward is obtained and the third synchronization period of each group based on converged action value function $Q(s_t, a_t)$. Master device 1B classifies slaves #1 to #13 into the plurality of groups based on the third classification information. At this point, for ease of description, it is assumed that the plurality of groups are groups G1 to G3, and that the third synchronization periods of groups G1 to G3 are M1 to M3.

Then, it is assumed that new other slave #14 other than slaves #1 to #13 is added to communication system 100. In this case, master device 1B adds slave #14 to one group (for example, group G1) among the plurality of groups G1 to G3 instead of immediately restarting the learning of machine learner 5 by adding another slave #14.

When a group obtained by adding slave #14 to group G1 is G1a, slaves #1 to #14 are classified into the plurality of groups G1a, G2, G3. In this manner, master device 1B adds slave #14 to group G1 among the plurality of groups G1 to G3 to classify slaves #1 to #14 into the plurality of groups G1a, G2, G3. At this point, the synchronization period of group G1a is the same as the synchronization period of group G1, namely, a synchronization period M1. The synchronization periods of groups G2, G3 remain at the synchronization periods M2, M3, respectively.

For each of the plurality of groups G1a, G2, G3, master device 1B executes the time synchronization along with at least one slave device classified into the group at the synchronization period set to the group. When the time synchronization is executed, master device 1B acquires the correction amount (hereinafter, also referred to as "a second correction amount") of the difference between the time of master device 1B and the time of slave device from each of slaves #1 to #14.

By the way, master device 1B can stably continue the communication system with respect to a change in environment to some extent by the converged action value function $Q(s_t, a_t)$, namely, robustness of the acquired learned model.

For this reason, when master device 1B executes the time synchronization with each slave device in association with the addition of slave #14, it is determined whether the sum of the synchronization periods and the correction amount of each slave device can be suppressed within an allowable range.

When the sum of the synchronization periods and the correction amount of each slave device is determined to be suppressed within the allowable range, the learned model can stably respond to the change in the environment, and thus, there is no problem even when master device 1B continuously uses the acquired learned model. On the other hand, when the sum of the synchronization periods and the correction amount of each slave device is determined not to be suppressed within the allowable range, the learned model cannot stably respond to the change in the environment, and thus, master device 1B needs to update the learned model by learning the learned model again and converge the learned model again. In this manner, the process of relearning the learning model that is once learned to become the learned model is referred to as relearning of the learned model. An example of the case where the learned model is relearned will be described below. Among the learned models, a learned model on which the relearning is not performed is referred to as "a learned model before relearning", and a learned model after the relearning is performed is referred to as "a learned model after relearning".

When at least one of the second correction amounts is equal to or larger than the reference threshold (that is, target correction amount Ys), master device 1B performs the learning of machine learner 5 again. Specifically, master device 1B inputs the second correction amounts, third synchronization periods M1 to M3, and fourth classification information Gx classifying slaves #1 to #14 into the plurality of groups G1a, G2, G3 to the learned model before relearning. As a result, the learned model that converges in the case of slaves #1 to #13 is relearned.

Master device 1B selects fifth classification information Gx1 classifying slaves #1 to #14 into a plurality of other groups and selects for each of the plurality of groups a new fourth synchronization period in which at least one slave device classified into the groups and master device 1B execute the time synchronization, using the learned model (that is, the learned model after relearning) relearned by inputting each of the second correction amounts, third synchronization periods M1 to M3, and fourth classification information Gx to the learned model before relearning. Then, when the relearning progresses and action value function Q($s_t$, $a_t$) converges, an optimized learned model is obtained in the case where communication system 100 includes slaves #1 to #14.

<Advantages>

According to the fourth embodiment, each slave device 2 can be classified into the plurality of groups so that the time synchronization accuracy can be secured using machine learning. As a result, the load on the network can be reduced while the time synchronization accuracy is ensured.

Fifth Embodiment

The configuration in which the classification information and the initial value of the synchronization period of each group are randomly selected is described in the fourth embodiment. In a fifth embodiment, a configuration in which the classification information and the initial value of the synchronization period of each group are set using the processing procedure of FIG. 9 in the first embodiment will be described.

Figure 25:
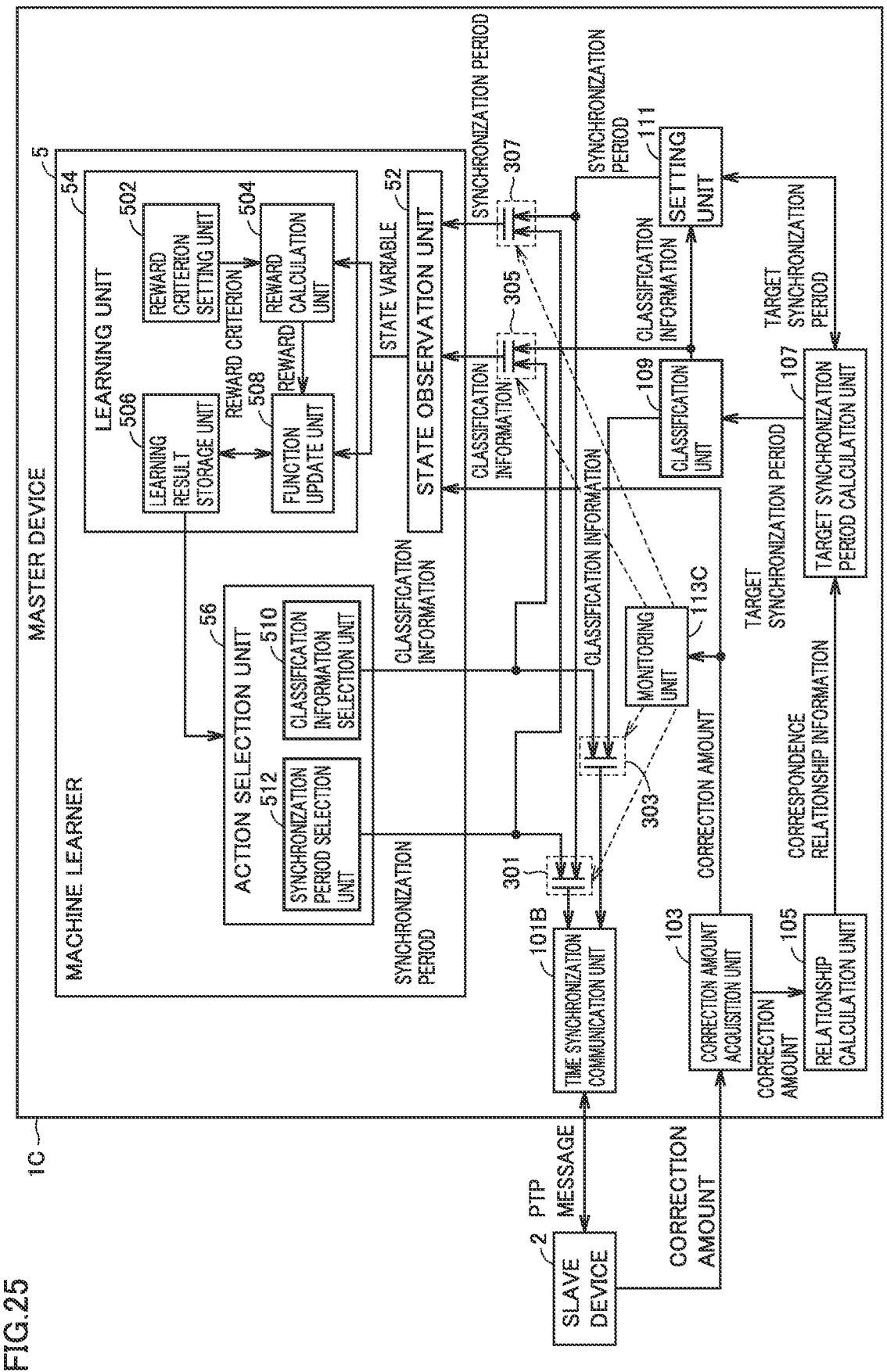
FIG. 25 is a diagram illustrating a functional configuration of a master device according to a fifth embodiment.

FIG. 25 is a diagram illustrating a functional configuration of a master device 1C of the fifth embodiment. Referring to FIG. 25, a master device 1C corresponds to a configuration in which relationship calculation unit 105, target synchronization period calculation unit 107, classification unit 109, and setting unit 111 in FIG. 8 are added to the functional configuration in FIG. 23, and a monitoring unit 113C is further added.

First, as described with reference to FIG. 8, the classification unit 109 classifies each slave device 2 into the plurality of groups. For each of the plurality of groups, setting unit 111 sets a new synchronization period in which at least one slave device 2 classified into the group and master device 1C execute the time synchronization. Time synchronization communication unit 101 executes the time synchronization along with the plurality of slave devices 2 belonging to each group at the synchronization period set to each group by setting unit 111. After the synchronization period of each group is set by setting unit 111, correction amount acquisition unit 103 acquires the correction amount from each slave device 2.

Then, monitoring unit 113C monitors whether at least one of the plurality of correction amounts acquired from the plurality of slave devices 2 is outside the target range (for example, larger than the target range upper limit Du or smaller than the target range lower limit Dd). Monitoring unit 113C counts the number of times (hereinafter, also referred to as "number of over times") that is outside the target range.

Figure 26:
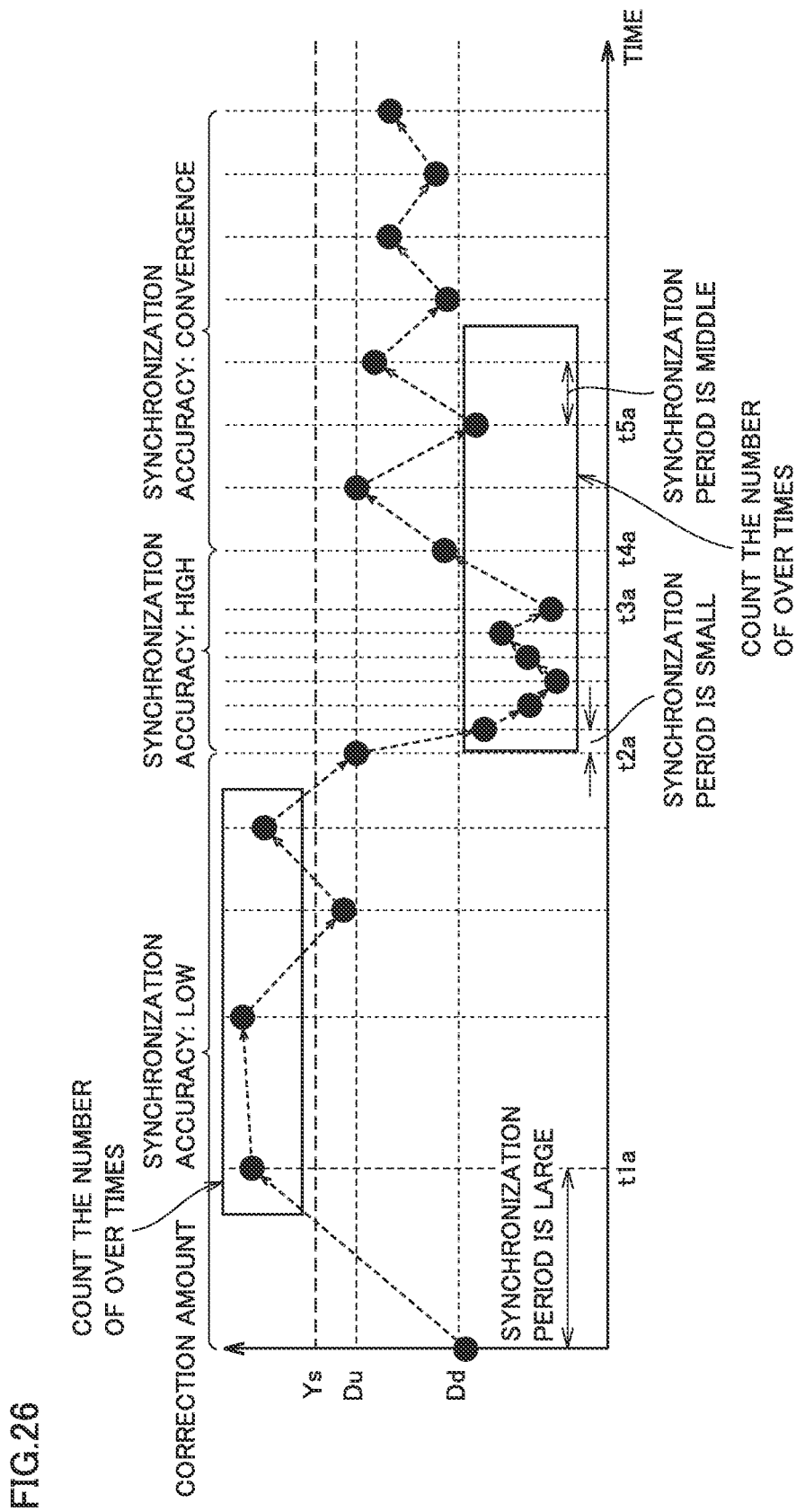
FIG. 26 is a diagram illustrating a scheme of counting a number of over times.

FIG. 26 is a diagram illustrating a scheme of counting the number of over times. Referring to FIG. 26, monitoring unit 113C counts the number of over times in which at least one of the correction amounts is outside the target range. In the example of FIG. 26, the number of times (that is, the number of over times) in which the correction amount acquired from a certain slave device 2 falls outside the target range between times t1a to t5a is 10 times.

Referring again to FIG. 25, monitoring unit 113C determines whether the number of over times reaches a threshold Th. Monitoring unit 113C gives an instruction to information switching unit 301, 303, 305, 307 based on the determination result.

Specifically, when the number of over times is less than threshold Th, monitoring unit 113C gives the instruction to information switching unit 301, 303, 305, 307 in order to advance the machine learning by the machine learner 5. Specifically, monitoring unit 113C instructs information switching unit 301 to output the synchronization period of each group from synchronization period selection unit 512 to time synchronization communication unit 101B. Monitoring unit 113C instructs information switching unit 303 to output the classification information from classification information selection unit 510 to time synchronization communication unit 101B, instructs information switching unit 305 to output the classification information from classification information selection unit 510 to state observation unit 52, and instructs information switching unit 307 to output the synchronization period of each group from synchronization period selection unit 512 to state observation unit 52.

On the other hand, when the number of over times is equal to or larger than threshold Th, monitoring unit 113C gives the instruction to information switching unit 301, 303, 305, 307 to advance the learning by machine learner 5 after doing the initial setting of the classification information and the synchronization period of each group over again. Specifically, monitoring unit 113C instructs information switching unit 301 to output the synchronization period of each group from setting unit 111 to time synchronization communication unit 101B. Monitoring unit 113C instructs information switching unit 303 to output the classification information from classification unit 109 to time synchronization communication unit 101B, instructs information switching unit 305 to output classification information from classification unit 109 to state observation unit 52, and instructs information switching unit 307 to output the synchronization period of each group from setting unit 111 to state observation unit 52.

As a result, the learning by machine learner 5 proceeds while the number of over times is less than threshold Th, and when the number of over times is greater than or equal to threshold Th during the learning by the machine learner 5, the initial setting is regarded as not preferable, and the initial setting of the classification information and the synchronization period of each group is executed again by setting unit 111 and classification unit 109.

<Processing Procedure>

Figure 27:
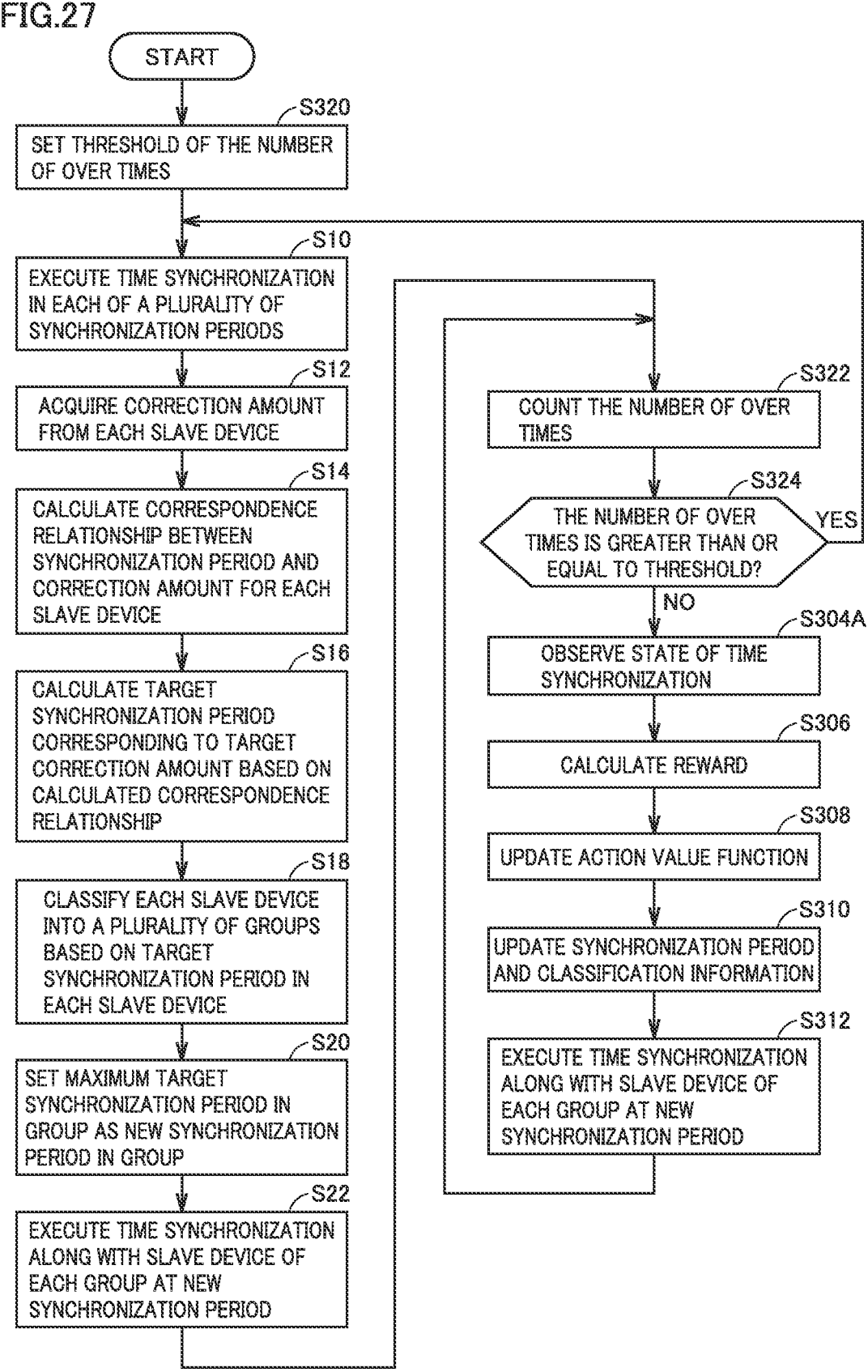
FIG. 27 is a flowchart illustrating an example of a processing procedure of a master device of the fifth embodiment.

FIG. 27 is a flowchart illustrating an example of the processing procedure of master device 1C of the fifth embodiment. Referring to FIG. 27, master device 1C sets threshold Th of the number of times (that is, the number of over times) at which at least one correction amount acquired from each slave devices 2 falls outside the target range (step S320). Because each processing of steps S10 to S22 is similar to the processing in FIG. 9, the detailed description thereof will not be repeated.

Master device 1C counts the number of times (that is, the number of over times) that at least one correction amount acquired from each slave device 2 is out of the target range when the time synchronization in step S22 is executed at the new synchronization period set in step S20 (step S322). Specifically, master device 1C adds one count to the current number of over times when at least one correction amounts is out of the target range, and maintains the current number of over times when each correction amount is within the target range.

Master device 1C determines whether the number of over times is equal to or larger than threshold Th (step S324). When the number of over times is equal to or larger than threshold Th (YES in step S324), master device 1C executes the processing of step S10. In this case, master device 1C executes the pieces of processing of steps S10 to S22 again, reclassifies each slave device 2 into the plurality of groups, and resets the synchronization period of each group.

When the number of over times is less than threshold Th (NO in step S324), master device 1C observes, from each slave device 2, each correction amount in executing the time synchronization in step S22, the classification information for classifying each slave device 2 into the plurality of groups set in step S18, and the synchronization period of each group set in step S20 as the state variables (step S304A).

Subsequently, master device 1C executes the pieces of processing of steps S306 to S312 described with reference to FIG. 24. Specifically, master device 1C selects other classification information for classifying each slave device 2 into the plurality of other groups and selects for each of the plurality of other groups another new synchronization period in which at least one slave device 2 classified into the group and the master device 1C execute the time synchronization, using a learning model in which each correction amount observed in step S304A, the synchronization period of each group, and the classification information are set as input. The selected other classification information is classification information different from the classification information corresponding to the processing in step S18, and the other new synchronization period is a synchronization period different from the new synchronization period set in step S20. Master device 1C classifies each slave device 2 into the plurality of other groups based on the selected classification information, and executes the time synchronization along with at least one slave device 2 belonging to each group at a synchronization period set to each group.

Subsequently, in step S322, when the time synchronization in step S312 is executed from each slave device 2, master device 1C counts the number of times in which at least one correction amount acquired from each slave device 2 is outside the target range. When the number of over times is less than threshold Th (NO in step S324), master device 1C executes step S304A. Specifically, master device 1C observes each correction amount in executing the time synchronization in step S312 and the classification information selected in step S310 and the synchronization period of each group as the state variables. Then, the pieces of processing of steps S306 to S312 described with reference to FIG. 24 are executed.

<Advantages>

According to the fifth embodiment, the time synchronization accuracy is prevented from deviating from the required target synchronization accuracy at the start of the machine learning. In addition, when the number of over times is equal to or larger than the threshold, it is assumed that the learning result is divergent, and the classification information and the synchronization period of each group can be set again.

Sixth Embodiment

The configuration in which master device 1 directly executes the time synchronization along with the plurality of slave devices 2 belonging to each group is described in the first embodiment. In a sixth embodiment, the time synchronization is executed between a sub-master device selected from the plurality of slave devices 2 belonging to each group and master device 1. In each group, the time synchronization is executed between the sub-master device and the plurality of slave devices 2.

Figure 28:
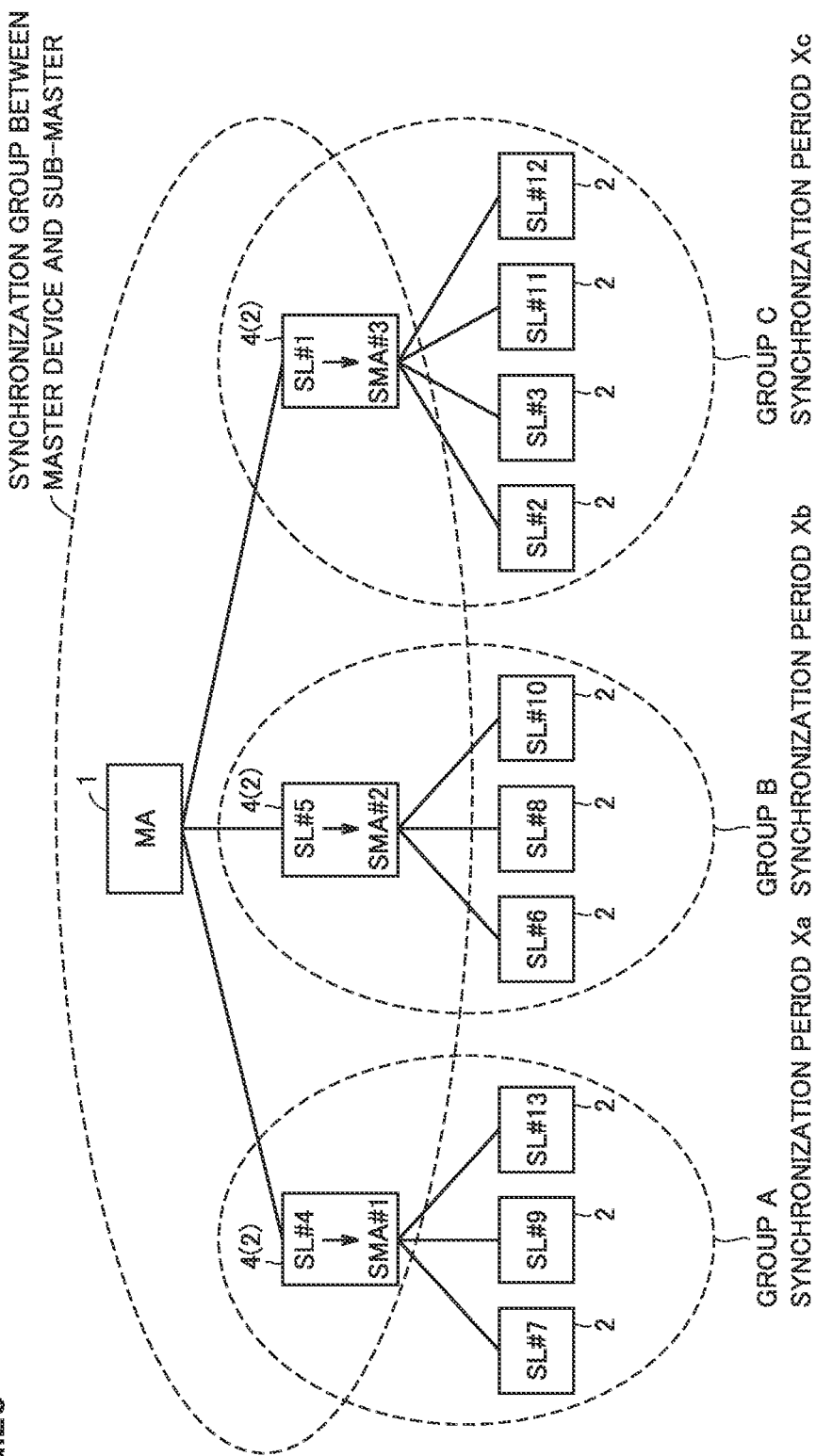
FIG. 28 is a diagram illustrating a configuration in a state in which a synchronization period is optimized in a communication system according to a sixth embodiment.

FIG. 28 is a diagram illustrating a configuration in a state in which the synchronization period is optimized in a communication system of the sixth embodiment. At this point, the initial configuration of the network is assumed to be a configuration in which the plurality of slave devices 2 are connected to master device 1 as illustrated in FIG. 4. When master device 1 divides each slave device 2 into the plurality of groups to select a sub-master device 4 representing each group, the network in FIG. 28 is formed.

Specifically, as described in the first embodiment, master device 1 classifies slaves #4, #7, #9, #13 into group A, classifies slaves #5, #6, #8, #10 into group B, and classifies slaves #1, #2, #3, #11, #12 into group C.

At this point, "SMA" in FIG. 28 represents sub-master device 4, and three sub-master devices 4 are also referred to as sub-masters #1 to #3. Master device 1 selects one slave device (for example, slave #4) among slave devices 2 belonging to group A as sub-master device 4 (hereinafter, also referred to as "a sub-master #1") in group A. Master device 1 selects one slave device (for example, slave #5) among slave devices 2 belonging to group B as sub-master device 4 (hereinafter, also referred to as "a sub-master #2") in group B, and selects one slave device (for example, slave #1) among slave devices 2 belonging to group C as sub-master device 4 (hereinafter, also referred to as "a sub-master #3") in group C. For example, the selection of sub-master device 4 is randomly performed.

Master device 1 sets maximum target synchronization period Xa among the target synchronization periods of the respective slave devices 2 belonging to group A as a new synchronization period in which the time synchronization is executed along with sub-master #1 of group A. Master device 1 sets target synchronization period Xb as a new synchronization period in which the time synchronization is executed along with sub-master #2 of group B, and sets target synchronization period Xc as a new synchronization period in which the time synchronization is executed sub-master #3 of group C. Master device 1 transmits and receives the PTP messages to and from sub-masters #1, #2, #3 at new synchronization periods Xa, Xb, Xc, and executes the time synchronization.

In addition, sub-master #1 transmits and receives the PTP message to and from slaves #7, #9, #13 belonging to group A at synchronization period Xa set by master device 1, and executes the time synchronization. Sub-master #2 executes the time synchronization along with slaves #6, #8, #10 belonging to group B at synchronization period Xb. Sub-master #3 executes the time synchronization along with the slaves #2, #3, #11, #12 belonging to group C at synchronization period Xc.

Each slave device 2 transmits the correction amount when the time synchronization is executed along with sub-master device 4 at the synchronization period to sub-master device 4. Sub-master device 4 transmits the correction amount acquired from each slave device 2 and the correction amount when sub-master device 4 executes the time synchronization along with master device 1 to master device 1. For example, sub-master #1 transmits the correction amount acquired from each of slaves #7, #9, #13 and the correction amount calculated by sub-master #1 to master device 1.

As described above, in the sixth embodiment, sub-master device 4 executes the time synchronization along with master device 1 at the set synchronization period, and executes the time synchronization along with each slave device 2 belonging to the same group as sub-master device 4 at the same synchronization period as the set synchronization period. Therefore, in the sixth embodiment, because the communication traffic of the PTP message of master device 1 can be reduced as compared with the first embodiment, the load on the network of master device 1 can be reduced.

<Functional Configuration>

Figure 29:
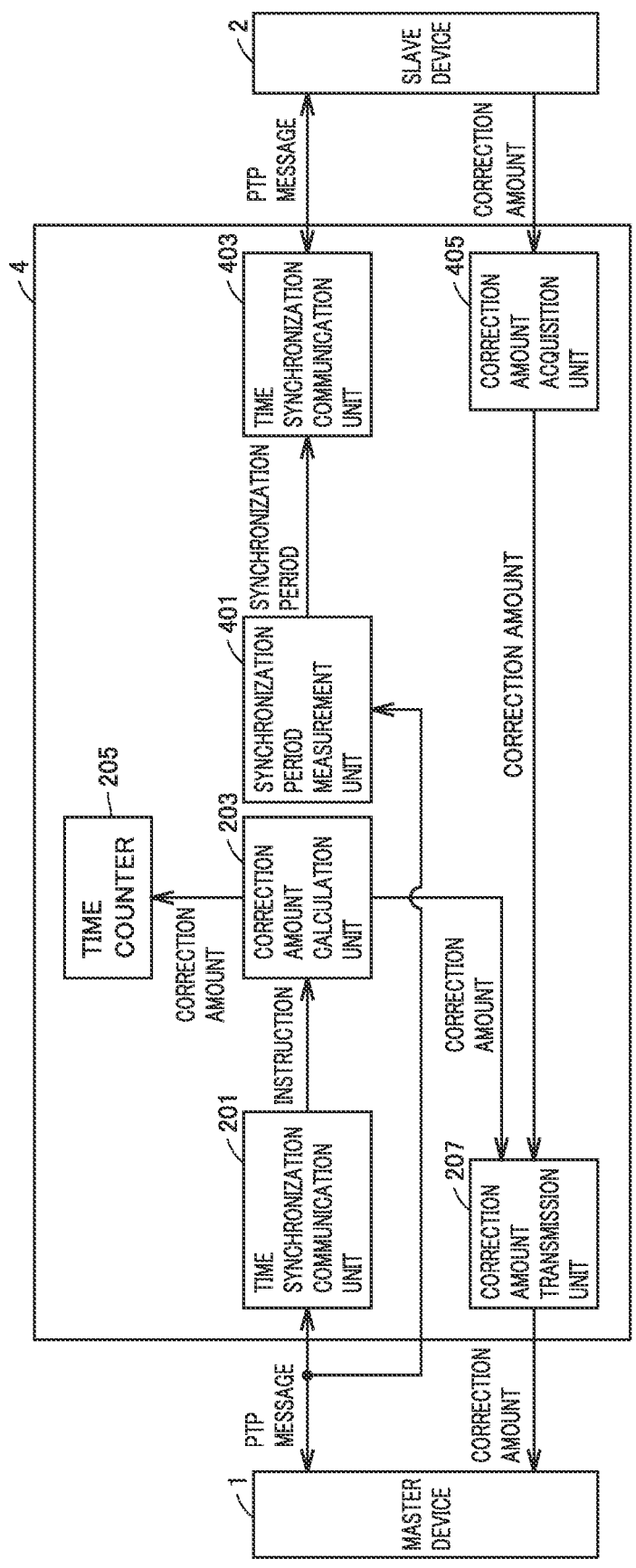
FIG. 29 is a schematic diagram illustrating a functional configuration of a sub-master device of the sixth embodiment.

FIG. 29 is a schematic diagram illustrating the functional configuration of sub-master device 4 of the sixth embodiment. Referring to FIG. 29, sub-master device 4 includes time synchronization communication unit 201, correction amount calculation unit 203, time counter 205, and correction amount transmission unit 207 as the functions as slave device 2 described in FIG. 8 of the first embodiment. Sub-master device 4 includes a synchronization period measurement unit 401, a time synchronization communication unit 403, and a correction amount acquisition unit 405 as the functions managing the time synchronization of each slave device 2 belonging to the same group. Typically, the CPU of sub-master device 4 executes the program stored in the memory, thereby implementing these functions. Some or all of these functions may be implemented using a dedicated circuit.

In FIG. 29, it is assumed that each slave device 2 is classified into the plurality of groups by master device 1, and that sub-master device 4 of each group is selected. Furthermore, it is assumed that master device 1 and slave device 2 have, for example, the functional configurations in FIG. 8.

Time synchronization communication unit 201 executes the time synchronization along with time synchronization communication unit 101 of master device 1 at the synchronization period set by master device 1. Correction amount calculation unit 203 calculates the correction amount of the time difference between the time (hereinafter, also referred to as "a sub-master time") of sub-master device 4 and the master time when the time synchronization is executed along with master device 1.

Synchronization period measurement unit 401 monitors the PTP message transmitted and received by time synchronization communication unit 101 and time synchronization communication unit 201 of master device 1. Synchronization period measurement unit 401 measures the synchronization period of the time synchronization between master device 1 and sub-master device 4 based on a transmission and reception interval of the PTP message. The synchronization period set by master device 1 is not notified of sub-master device 4. For this reason, in order to grasp the synchronization period on the side of sub-master device 4, synchronization period measurement unit 401 measures the synchronization period of the time synchronization between master device 1 and sub-master device 4.

Time synchronization communication unit 403 executes the time synchronization along with each slave device 2 belonging to the same group as sub-master device 4 at the measured synchronization period (that is, the synchronization period of the time synchronization executed between master device 1 and sub-master device 4). Each slave device 2 calculates the correction amount of the time difference between the sub-master time and the slave time when the time synchronization is performed along with sub-master device 4 at the synchronization period. Correction amount acquisition unit 405 acquires the calculated correction amount from each slave device 2.

Correction amount transmission unit 207 transmits the correction amount calculated by correction amount calculation unit 203 and the correction amount acquired from each slave device 2 to master device 1.

<Processing Procedure>

FIG. 30 is a flowchart illustrating an example of the operation of the communication system according to the sixth embodiment. Typically, CPU 11 of master device 1 executes the program stored in memory 12 to perform the pieces of processing in steps S10 to S18 and S80 to S84 in FIG. 30. Typically, the CPU of sub-master device 4 executes the program stored in the memory to perform the pieces of processing in steps S102 to S108 in FIG. 30. At the start of the flowchart, it is assumed that each slave device 2 is not classified into the plurality of groups.

Referring to FIG. 30, because the pieces of processing of steps S10 to S18 are similar to the pieces of processing in FIG. 9, the detailed description thereof will not be repeated. When the pieces of processing up to step S18 end, each slave device 2 is classified into the plurality of groups. For example, as illustrated in FIG. 28, each slave device 2 is classified into groups A to C.

After step S18, master device 1 selects sub-master device 4 from at least one slave device 2 classified into the group for each of the plurality of groups (step S80). For example, master device 1 randomly selects sub-master device 4 from slave devices 2.

For each of the plurality of groups, master device 1 sets the maximum target synchronization period among the target synchronization periods in at least one slave devices 2 classified into the group as a new synchronization period in which master device 1 executes the time synchronization along with sub-master device 4 in the group (step S82). Master device 1 executes the time synchronization along with sub-master device 4 in each group at a new synchronization period set to each group (step S84).

Subsequently, sub-master device 4 calculates the correction amount (hereinafter, also referred to as "a first time correction amount" for convenience) of the time difference between the master time and the sub-master time when the time synchronization is executed along with master device 1 at the new synchronization period, and corrects the sub-master time using the first time correction amount (step S102). Sub-master device 4 measures the synchronization period of the time synchronization executed along with master device 1 based on the transmission and reception interval of the PTP message transmitted to and received from the master device 1 (step S104).

Sub-master device 4 executes the time synchronization along with each slave device 2 classified into a group identical to that of sub-master device 4 at the measured synchronization period (that is, the new synchronization period) (step S106). Each slave device 2 calculates the correction amount (hereinafter, also referred to as "a second time correction amount" for convenience) when the time synchronization is executed along with sub-master device 4 at the synchronization period, and transmits the second time correction amount to sub-master device 4. Sub-master device 4 transmits the first time correction amount calculated in step S102 and the second time correction amount acquired from each slave device 2 to master device 1 (step S108).

In the above description, master device 1 may execute the processing in step S32 of FIG. 10 using each time correction amount transmitted in step S108. Specifically, when at least one of the plurality of time correction amounts received from sub-master devices 4 is greater than or equal to target correction amount Ys, master device 1 re-executes the pieces of processing from step S10. In this case, master device 1 resets the synchronization period in executing the time synchronization along with each slave device 2 based on the plurality of time correction amounts acquired from each sub-master device 4.

When all the time correction amounts received from the sub-master devices 4 are less than target correction amount Ys, master device 1 repeats the pieces of processing from step S84. In this case, master device 1 executes the time synchronization along with sub-master device 4 and sub-master device 4 executes the time synchronization along with each slave device 2 at the currently set synchronization period.

In the sixth embodiment, each slave device 2 may be classified into the plurality of groups by adopting the classification scheme according to another embodiment (for example, the second, fourth, and fifth exemplary embodiments). Furthermore, in the sixth embodiment, as illustrated in FIG. 14 of the third embodiment, master device 1 and each slave device 2 may be configured to perform the multi-hop communication according to the communication path having the minimum hop count. In this case, sub-master device 4 is set to the node corresponding to the first hop path from master device 1. For example, sub-master #1 in group A is slave #4, sub-master #2 in group B is slave #5, and sub-master #3 in group C is slave #1.

<Advantages>

According to the sixth embodiment, in addition to the advantages of the first embodiment, the communication traffic of the PTP message of master device 1 can be reduced while the time synchronization accuracy is secured, and the load on the network of master device 1 can be reduced. In addition, because it is not necessary to use an expensive and highly accurate clock oscillator in master device 1, sub-master device 4, and slave device 2, the price of the device can be suppressed.

Other Embodiments (1) In the first embodiment, the configuration in which the time synchronization is executed the plurality of times for each synchronization period to obtain the correspondence relationship (for example, linear function 501) between the synchronization period and the correction amount in consideration of the variation in the correction amount is described. However, the present disclosure is not limited to the configuration of the first embodiment. For example, by a similar method, the correspondence relationship between the synchronization period and the correction amount may be obtained by executing the time synchronization once for each synchronization period. In this case, the correspondence relationship in each of the plurality of slave devices 2 is the linear function obtained by linearly approximating the correction amount in slave device 2 with respect to the synchronization period in which slave device 2 executes the time synchronization along with master device 1.

(2) In the fourth and fifth embodiments, the configuration in which the correction amount acquired from each slave device 2, the synchronization period of each group, and the classification information are used as the state variable is described. However, the present disclosure is not limited to the configuration of the fourth and fifth embodiments. For example, the classification information may not be used as the state variable. In this case, the state variable is the correction amount and one synchronization period acquired from each slave device 2.

Specifically, master device 1B randomly sets the initial value of the synchronization period, and executes the time synchronization along with each slave device 2 at the set synchronization period. Master device 1B acquires the correction amount of the difference between the time of master device 1B and the time of slave device 2 from each slave device 2 when the time synchronization is executed along with master device 1B at the synchronization period.

Then, master device 1B selects the new synchronization period in which master device 1B executes the time synchronization along with each slave device 2 using the learning model in which each acquired correction amount and the synchronization period are used as the input. Specifically, master device 1B observes each correction amount and the synchronization period as the state variable. Master device 1B calculates the reward according to the reward criterion described above, updates action value function $Q(s_t, a_t)$ using equation (7), and selects the new synchronization period using a known action selection scheme.

Subsequently, master device 1B executes the time synchronization along with each slave device 2 at the selected synchronization period. Then, when action value function $Q(s_t, a_t)$ converges, master device 1B selects the synchronization period in which the most reward is obtained based on action value function $Q(s_t, a_t)$. Master device 1B executes the time synchronization along with each slave device 2 based on the selected synchronization period.

Because delay time td and time difference tdiff vary due to the factors such as the temperature change of the surrounding environment in which slave device 2 is used, the temperature of the surrounding environment of slave device 2 may be further included as the state variable. In this case, a temperature sensor may be mounted on slave device 2, and slave device 2 may transmit the detected temperature to the master device together with the correction amount of the time synchronization.

(3) In the fourth and fifth embodiments, the case where the machine learner 5 performs the machine learning using the reinforcement learning is described. However, the present disclosure is not limited thereto. Machine learner 5 may perform the machine learning using supervised learning, unsupervised learning, semi-supervised learning, or the like.

Furthermore, as the learning algorithm described above, deep learning that learns extraction of the feature amount itself can be used, and the machine learning may be executed according to another known method, for example, a neural network, genetic programming, functional logic programming, a support vector machine, or the like.

(4) In the embodiment described above, the clustering function of slave device 2 by the k-means method, the synchronization period setting function, and the machine learning function are installed in the master device. However, the present disclosure is not limited thereto. For example, the machine learner may be implemented by a GPGPU, or may be implemented by being placed on a cloud server and communicating between the master device and the cloud server. In addition, each processing of the master device and the slave device described above may be implemented by a software program or a combination of an electronic circuit and a software program.

(5) The configuration exemplified as the above-described embodiment is an example of the configuration of the present disclosure, and can be combined with another known technique, or can be modified, for example, partially omitted without departing from the gist of the present disclosure. In addition, in the above-described embodiment, the processing and configuration described in other embodiments may be appropriately adopted and implemented.

It should be considered that the disclosed embodiment is an example in all respects and not restrictive. The scope of the present disclosure is defined by not the above description, but the claims, and it is intended that all modifications within the meaning and scope of the claims are included in the present disclosure.

REFERENCE SIGNS LIST 1, 1A to 1C: master device, 2, 2A: slave device, 3: network, 4: sub-master device, 5: machine learner, 11: CPU, 12: memory, 13: network interface, 14: bus, 52: state observation unit, 54: learning unit, 56: action selection unit, 100, 100A: communication system, 101, 101B, 201, 403: time synchronization communication unit, 103, 405: correction amount acquisition unit, 105: relationship calculation unit, 107: target synchronization period calculation unit, 109: classification unit, 111: setting unit, 113, 113C: monitoring unit, 115: path calculation unit, 203: correction amount calculation unit, 205: time counter, 207: correction amount transmission unit, 209: path search unit, 301, 303, 305, 307: information switching unit, 401: synchronization period measurement unit, 502: reward reference setting unit, 504: reward calculation unit, 506: learning result storage unit, 508: function updating unit, 510: classification information selection unit, 512: synchronization period selection unit

The invention claimed is:

1. A communication system comprising:
a master device; and
a plurality of slave devices to perform time synchronization along with the master device based on a time synchronization message transmitted from the master device,
wherein each of the slave devices stores a correction amount of a difference between a time of the master device and a time of the slave device for each of a plurality of synchronization periods when the time synchronization is performed along with the master device at the synchronization period,
the master device:
acquires the correction amount for each synchronization period from each of the slave devices;
calculates for each of the plurality of slave devices a correspondence relationship between a synchronization period in which the master device performs the time synchronization along with the slave device and a correction amount of a difference between a time of the master device and a time of the slave device based on each of the correction amounts acquired from the slave device;
calculates for each of the plurality of slave devices a target synchronization period corresponding to a target value of the correction amount in the slave device based on the correspondence relationship of the slave device;
classifies each of the slave devices into a plurality of groups based on the target synchronization period in each of the slave devices; and
sets for each of the plurality of groups a maximum target synchronization period among the target synchronization periods of at least one slave device classified into the group to a new synchronization period in which the master device performs the time synchronization along with the at least one slave device.

2. The communication system according to claim 1, wherein each of the slave devices performs the time synchronization along with the master device a plurality of times for each of the plurality of synchronization periods, and stores each of the correction amounts for the plurality of times,
the master device calculates for each of the plurality of slave devices the correspondence relationship in the slave device based on each of the correction amounts of the plurality of times acquired from the slave device, and
the correspondence relationship in each of the plurality of slave devices is a linear function obtained by linearly approximating an addition value of an average value and a standard deviation in the correction amounts of the plurality of times with respect to a synchronization period in which the slave device performs the time synchronization along with the master device.

3. The communication system according to claim 2, wherein for each of the plurality of slave devices the master device calculates the target synchronization period in the slave device based on the linear function in the slave device and a target value of the correction amount.

4. The communication system according to claim 1, wherein for each of the plurality of slave devices the master device calculates a distance between the target synchronization period in the slave device and a cluster center corresponding to each of the groups, and classifies the slave device into a group corresponding to the cluster center for which the distance is smallest.

5. The communication system according to claim 1, wherein when at least one of the correction amounts acquired from each of the slave devices is greater than or equal to the target value after the new synchronization period is set, the master device executes each of processing of acquiring each of the correction amounts, processing of calculating the correspondence relationship, processing of calculating the target synchronization period, processing of classifying each of the slave devices into the plurality of groups, and processing of setting the new synchronization period again.

6. The communication system according to claim 1, wherein
the master device:
classifies each of the slave devices into a first plurality of candidate groups based on the target synchronization period in each of the slave devices;
classifies each of the slave devices into a second plurality of candidate groups different from the first plurality of candidate groups;
based on a predetermined equation, calculates a first evaluation value indicating a network load on the communication system when each of the slave devices is classified into the first plurality of candidate groups and a second evaluation value indicating a network load on the communication system when each of the slave devices is classified into the second plurality of candidate groups; and
determines a plurality of candidate groups corresponding to a minimum evaluation value of the first and second evaluation values as the plurality of groups.

7. The communication system according to claim 6, wherein the master device classifies each of the slave devices into the second plurality of candidate groups by executing at least one of a change in a target value of the correction amount used for classification into the first plurality of candidate groups and a change in a number of the first plurality of candidate groups.

8. The communication system according to claim 7, wherein the master device classifies each of the slave devices into a third plurality of candidate groups by replacing the slave device belonging to a first candidate group among the second plurality of candidate groups with the slave device belonging to a second candidate group among the second plurality of candidate groups.

9. The communication system according to claim 1, wherein the master device and each of the slave devices are capable of multi-hop communication, and the master device:
calculates for each of the plurality of groups a plurality of communication paths between the master device and the plurality of slave devices belonging to the group; and for each of the plurality of groups, according to a communication path of the plurality of communication paths in the group that minimizes a number of hops of the plurality of slave devices belonging to the group, performs multi-hop communication with the plurality of slave devices.

10. The communication system according to claim 1, wherein the master device counts a number of times at which at least one of the correction amounts acquired from each of the slave devices is out of a target range when the time synchronization is executed at the new synchronization period, and when the number of times is less than a threshold, the master device uses a learning model in which each of the correction amounts, each of the new synchronization periods, and classification information for classifying each of the slave devices into the plurality of groups are set as input to select another classification information for classifying each of the slave devices into a plurality of other groups and select for each of the plurality of other groups another new synchronization period in which at least one slave device classified into the group and the master device perform the time synchronization.

11. A master device communicable with a plurality of slave devices, wherein the master device comprises a processor configured to:
acquire from each of the slave devices for each of a plurality of synchronization periods a correction amount of a difference between a time of the master device and a time of the slave device when the time synchronization is performed along with the master device at the synchronization period;
calculate for each of the plurality of slave devices a correspondence relationship between a synchronization period in which the master device performs the time synchronization along with the slave device and a correction amount of a difference between a time of the master device and a time of the slave device based on each of the correction amounts acquired from the slave device;
calculate for each of the plurality of slave devices a target synchronization period corresponding to a target value of the correction amount in the slave device based on the correspondence relationship of the slave device;
classify each of the slave devices into a plurality of groups based on the target synchronization period in each of the slave devices; and
set for each of the plurality of groups a maximum target synchronization period among the target synchronization periods of at least one slave device classified into the group to a new synchronization period in which the master device performs the time synchronization along with the at least one slave device.

12. A communication system comprising:
a master device; and
a plurality of slave devices to perform time synchronization along with the master device based on a time synchronization message transmitted from the master device, wherein the master device:
classifies each of the slave devices into a first plurality of groups based on first classification information;
performs for each of the first plurality of groups the time synchronization along with at least one slave device classified into the group at a first synchronization period set for the group,
acquires from each of the slave devices a first correction amount of a difference between a time of the master device and a time of the slave device when the time synchronization is performed, and
using a learning model in which each of the first correction amounts, each of the first synchronization periods, and the first classification information are set as input, selects second classification information for classifying each of the slave devices into a second plurality of groups and select for each of the second plurality of groups a new second synchronization period in which at least one slave device classified into the group and the master device perform the time synchronization.

13. The communication system according to claim 12, wherein the master device calculates a reward used for learning of the learning model based on at least one of a sum of the first synchronization periods and the first correction amounts.

14. The communication system according to claim 12, wherein the master device:
based on a learned model in which learning of the learning model is completed, selects third classification information for classifying the plurality of slave devices into a third plurality of groups and selects for each of the third plurality of groups a new third synchronization period in which at least one slave device classified into the group and the master device perform the time synchronization;
classifies the plurality of slave devices into the third plurality of groups based on the third classification information;
adds a new other slave device to one of the third plurality of groups to classify the plurality of slave devices and the other slave device into a fourth plurality of groups; and
performs for each of the fourth plurality of groups at the third synchronization period set for the group the time synchronization along with at least one slave device classified into the group.

15. The communication system according to claim 14, wherein the master device:
acquires a second correction amount of a difference between a time of the master device and a time of the slave device from each of the plurality of slave devices and the other slave device when the time synchronization is performed at the third synchronization period;
when at least one of the second correction amounts is greater than or equal to a reference threshold, inputs each of the second correction amounts, each of the third synchronization periods, and fourth classification information for classifying the plurality of slave devices and the other slave device into the fourth plurality of groups to the learned model before relearning; and
using the learned model that is relearned by inputting each of the second correction amounts, each of the third synchronization periods, and the fourth classification information to the learned model before the relearning, selects fifth classification information for classifying the plurality of slave devices and the other slave device into a fifth plurality of groups and selects for each of the fifth plurality of groups a new fourth synchronization period in which at least one slave device classified into the group and the master device perform the time synchronization.

16. A sub-master device communicable with a master device and a plurality of slave devices, wherein the sub-master device comprises a processor configured to:

calculate a first time correction amount indicating a correction amount of a difference between a time of the master device and a time of the sub-master device when time synchronization is performed along with the master device at a set synchronization period;

perform the time synchronization along with the plurality of slave devices at the synchronization period;

acquire from each of the slave devices a second time correction amount indicating a correction amount of a difference between the time of the sub-master device and the time of the slave device when the time synchronization is performed along with the sub-master device at the synchronization period; and transmit the first time correction amount and each of the second time correction amounts to the master device.

* * * * *